324-77 CROSS REFERENCE SEARCH ROOM

Sept. 27, 1960 W. D. WHITE 2,954,465

SIGNAL TRANSLATION APPARATUS UTILIZING DISPERSIVE NETWORKS AND THE LIKE, e.g. FOR PANORAMIC RECEPTION, AMPLITUDE-CONTROLLING FREQUENCY RESPONSE, SIGNAL FREQUENCY GATING FREQUENCY-TIME DOMAIN CONVERSION, ETC.

Filed Aug. 7, 1958 13 Sheets-Sheet 1

INVENTOR.
Warren D. White
BY
ATTORNEYS
Pennie, Edmonds, Morton, Barrows & Taylor Sept. 27, 1960 W. D. WHITE 2,954,465

SIGNAL TRANSLATION APPARATUS UTILIZING DISPERSIVE NETWORKS AND THE LIKE, e.g. FOR PANORAMIC RECEPTION, AMPLITUDE-CONTROLLING FREQUENCY RESPONSE, SIGNAL FREQUENCY GATING FREQUENCY-TIME DOMAIN CONVERSION, ETC.

Filed Aug. 7, 1958 13 Sheets-Sheet 2

INVENTOR
Warren D. White
BY
ATTORNEYS

INVENTOR.
BY Warren D. White
ATTORNEYS
Pennie Edmonds Morton Barrows & Taylor

Sept. 27, 1960 W. D. WHITE 2,954,465

SIGNAL TRANSLATION APPARATUS UTILIZING DISPERSIVE NETWORKS AND THE LIKE, *e.g.* FOR PANORAMIC RECEPTION, AMPLITUDE-CONTROLLING FREQUENCY RESPONSE, SIGNAL FREQUENCY GATING FREQUENCY-TIME DOMAIN CONVERSION, ETC.

Filed Aug. 7, 1958 13 Sheets-Sheet 4

INVENTOR.

BY Warren D. White

ATTORNEYS

Pennie Edmonds Morton Barrows & Taylor

SIGNAL TRANSLATION APPARATUS UTILIZING DISPERSIVE NETWORKS AND THE LIKE, e.g. FOR PANORAMIC RECEPTION, AMPLITUDE-CONTROLLING FREQUENCY RESPONSE, SIGNAL FREQUENCY GATING FREQUENCY-TIME DOMAIN CONVERSION, ETC.

Filed Aug. 7, 1958 13 Sheets-Sheet 5

INVENTOR.
BY Warren D. White
ATTORNEYS

Sept. 27, 1960 W. D. WHITE 2,954,465

SIGNAL TRANSLATION APPARATUS UTILIZING DISPERSIVE NETWORKS AND THE LIKE, e. g. FOR PANORAMIC RECEPTION, AMPLITUDE-CONTROLLING FREQUENCY RESPONSE, SIGNAL FREQUENCY GATING FREQUENCY-TIME DOMAIN CONVERSION, ETC.

Filed Aug. 7, 1958 13 Sheets-Sheet 6

INVENTOR.

BY Warren D. White

ATTORNEYS

INVENTOR.
BY Warren D. White
ATTORNEYS

Sept. 27, 1960 W. D. WHITE 2,954,465

SIGNAL TRANSLATION APPARATUS UTILIZING DISPERSIVE NETWORKS AND THE LIKE, e.g. FOR PANORAMIC RECEPTION, AMPLITUDE-CONTROLLING FREQUENCY RESPONSE, SIGNAL FREQUENCY GATING FREQUENCY-TIME DOMAIN CONVERSION, ETC.

Filed Aug. 7, 1958 13 Sheets-Sheet 8

INVENTOR.

BY Warren D. White

ATTORNEYS

Pennie Edmonds Morton Barrows & Taylor

INVENTOR.
BY Warren D. White
ATTORNEYS
Pennie Edmonds Morton Barrows & Taylor

INVENTOR.
BY Warren D. White
ATTORNEYS
Pennie Edmonds Morton Barrows & Taylor

Sept. 27, 1960 W. D. WHITE 2,954,465
SIGNAL TRANSLATION APPARATUS UTILIZING DISPERSIVE NETWORKS AND THE LIKE, e.g. FOR PANORAMIC RECEPTION, AMPLITUDE-CONTROLLING FREQUENCY RESPONSE, SIGNAL FREQUENCY GATING FREQUENCY-TIME DOMAIN CONVERSION, ETC.
Filed Aug. 7, 1958 13 Sheets-Sheet 11

*INVENTOR.*
*BY* Warren D. White
*ATTORNEYS*

Sept. 27, 1960 W. D. WHITE 2,954,465

SIGNAL TRANSLATION APPARATUS UTILIZING DISPERSIVE NETWORKS AND THE LIKE, e.g. FOR PANORAMIC RECEPTION, AMPLITUDE-CONTROLLING FREQUENCY RESPONSE, SIGNAL FREQUENCY GATING FREQUENCY-TIME DOMAIN CONVERSION, ETC.

Filed Aug. 7, 1958 13 Sheets-Sheet 12

INVENTOR.

BY Warren D. White

ATTORNEYS

SIGNAL TRANSLATION APPARATUS UTILIZING DISPERSIVE NETWORKS AND THE LIKE, e.g. FOR PANORAMIC RECEPTION, AMPLITUDE-CONTROLLING FREQUENCY RESPONSE, SIGNAL FREQUENCY GATING FREQUENCY-TIME DOMAIN CONVERSION, ETC.

Filed Aug. 7, 1958

INVENTOR.
BY Warren D. White
ATTORNEYS

United States Patent Office 2,954,465
Patented Sept. 27, 1960

2,954,465

SIGNAL TRANSLATION APPARATUS UTILIZING DISPERSIVE NETWORKS AND THE LIKE, E.G. FOR PANORAMIC RECEPTION, AMPLITUDE-CONTROLLING FREQUENCY RESPONSE, SIGNAL FREQUENCY GATING, FREQUENCY-TIME DOMAIN CONVERSION, ETC.

Warren D. White, East Norwich, N.Y., assignor to Cutler-Hammer, Inc., Milwaukee, Wis., a corporation of Delaware Filed Aug. 7, 1958, Ser. No. 753,698

66 Claims. (Cl. 250—20)

This invention relates broadly to signal translation devices employing sweep frequency heterodyne circuits, and particularly to such circuits which are capable of receiving a number of different frequencies simultaneously and yet give adequate resolution therebetween. In one aspect, the invention is directed to radio monitoring receivers of the panoramic type capable of continuous coverage of a wide signal band, and yet displaying signals within that band separately according to their frequency. In another aspect, the invention is directed to circuits analogous to filters, in which the frequency response can be amplitude-controlled in the time domain. A monitoring receiver of special characteristics in which both aspects of the invention are combined in also provided. Many features of the invention, although particularly useful in connection with the foregoing, are capable of other applications.

In my copending application Serial No. 710,210, filed January 21, 1958, for "Electronic Circuits," now Patent No. 2,882,395, there is described, among other things, the use of a dispersive network in a panoramic receiver of the superheterodyne type so that the sweep rate can be greatly increased while preserving the same resolution or, conversely, so that the resolution can be increased while preserving the same sweep rate, etc. For a linear sweep with fast retrace, the sweep rate is approximately the product of the sweep frequency range and the sweep repetition frequency. When the invention of that application is employed to increase the sweep repetition frequency, there is less likelihood of missing brief transmissions. However, there is always the possibility that trasmissions will be so brief, or of such a character, as to be overlooked due to the time gaps in the reception of a signal of given frequency.

In my copending application Serial No. 805,991, filed April 13, 1959, for Electronic Circuits, an improved panoramic superheterodyne receiver is described capable of approaching continuous coverage of an R.-F. signal band while yielding adequate resolution between different R.-F. signals. In accordance with that improvement, if the bandwidths of the I.-F. channel and dispersive network are made at least equal to the sum of the sweep frequency range of the local oscillator and the desired R.-F. acceptance band, and the sweep frequency retrace time is negligible, substantially continuous coverage can be obtained. In some cases it may be difficult to make the retrace time negligible, and in such cases time gaps in the reception of a given signal may result. Also, for some applications components of sufficient bandwidth may be difficult or expensive to produce.

In accordance with one aspect of the present invention, a receiver is provided capable of continuous coverage of a signal band with adequate resolution, but in which the bandwidth and retrace speed requirements are considerably less stringent. Broadly, input signals of different frequencies are converted into respective interlaced sets of frequency variations spaced in time in accordance with the input signal frequencies. That is, each input signal is converted into a set of interlaced frequency variations, and the sets corresponding to input signals of different frequencies are spaced in time depending on the input frequencies. The frequency variations are then converted into corresponding signals of substantially shorter time durations respectively. Thus the short signals corresponding to different input signals are spaced in the time domain, and those corresponding to an input signal of given frequency recur at the interlaced frequency. As described hereinafter in connection with specific embodiments, a plurality of signal channels and a corresponding plurality of interlaced sweep frequencies may be employed, with one or more dispersive networks.

In accordance with another aspect of the invention, circuits analogous to filters are provided which have substantial advantages over arrangements heretofore known. Broadly, input signals of different frequencies are converted into corresponding signal pulses spaced in time in accordance with the respective input frequencies, the signal pulses altered while in the time domain, and the altered pulses converted into corresponding signals whose frequency corresponds to the time occurrence of the pulses.

In the specific embodiments described hereinafter, dispersive networks are used in converting signals from frequency to time domains, and inverse dispersive networks in converting from time to frequency domains. Then, by suitably operating on the signals while they are in the time domain, modified signals in the frequency domain may be obtained.

Such arrangements are capable of many applications. For example, it may be desired to have a bandpass filter whose frequency response may be varied quickly in any desired manner. With heretofore known apparatus, changes in bandpass characteristics are possible only to a limited degree, and all but the simplest changes require fairly elaborate apparatus. Even then, changing the bandpass characteristic quickly is often difficult, if not impossible.

On the other hand, generators of waveforms whose amplitude varies with time in almost any desired manner are now well-known. For example, the generation of sine waves, sawtooth waves, triangular waves, pulse waves, etc. is well-known, and by suitable combinations of such waves many different forms of control waves are possible.

In accordance with the present invention such well-known waveforms can be used to produce corresponding variations in the frequency response of a signal translation system.

In the apparatus for controlling frequency response it is preferred to employ the interlaced feature of the invention, since this enables obtaining signals in the time domain representing continuous coverage of input signals in the frequency domain, so that no essential signal information is lost. However, the wide band arrangement of my application Serial No. 805,991 may also be employed if desired, particularly where the time gaps due to finite frequency retrace times do not seriously affect operation. Also, for some applications it may suffice to employ relatively narrow bands and high sweep repetition frequencies so that the output signals are, in effect, repetitive samples of the corresponding input signals.

The present invention also contemplates a receiver providing substantially continuous coverage of a signal band, in which a frequency response control circuit is incorporated and controlled by the received signals. Thus, the shape of the receiver passband may be adjusted automatically to match the shape of the signal spectrum or, conversely, may be adjusted to reject signals of a persistent nature, thus making new signals more readily discernible. Or, a gating signal may be employed so as to pick out any particular signal for analysis, without in any way impairing the ability of the receiver to respond to other signals in the band for which it is designed.

Further features of the invention will in part be pointed out in the following description of specific embodiments thereof, and in part will be apparent therefrom.

Although many features of the invention are especially directed to radio monitoring receivers, they are also applicable to other apparatus such as audio or radio frequency spectrum analyzers, noise analyzers, etc. Further, the adjustable-characteristic filters, etc. may be used in many widely different applications.

The invention will be more fully understood by reference to the following description of specific embodiments thereof.

In the drawings:

Fig. 1 illustrates a panoramic receiver in accordance with the invention, Fig. 1(*a*) is a detail showing a dispersive network, and Figs. 1(*b*) and 1(*c*) are modifications of the receiver of Fig. 1;

Figs. 2, 3 and 3*a* are graphs explanatory of the operation of the receiver of Fig. 1;

Figure 1:
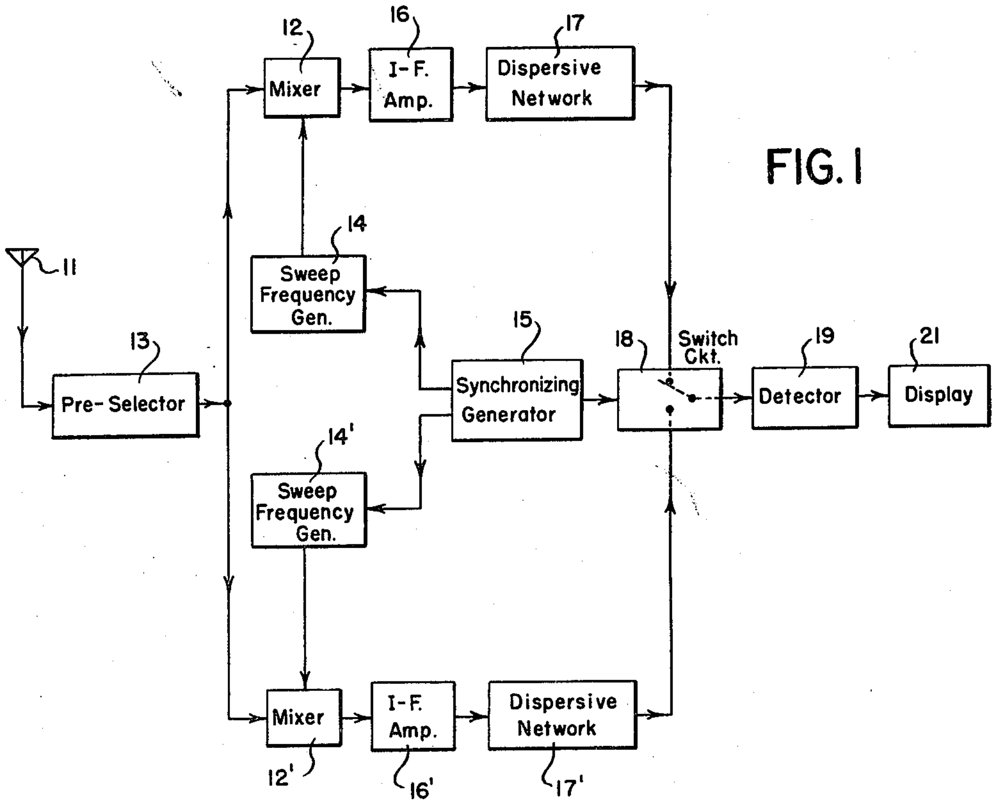
Figure 1A:
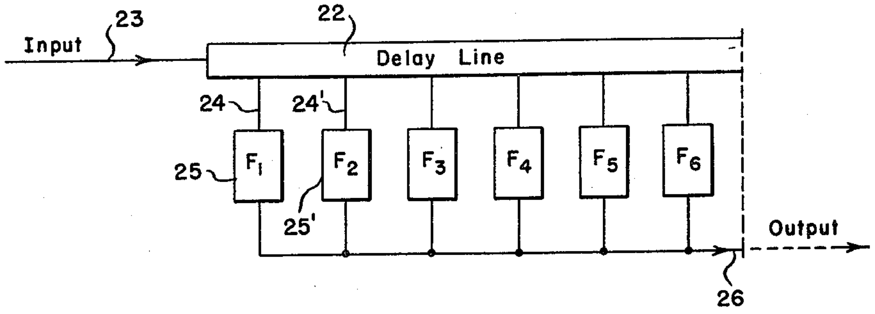
Figure 1B:
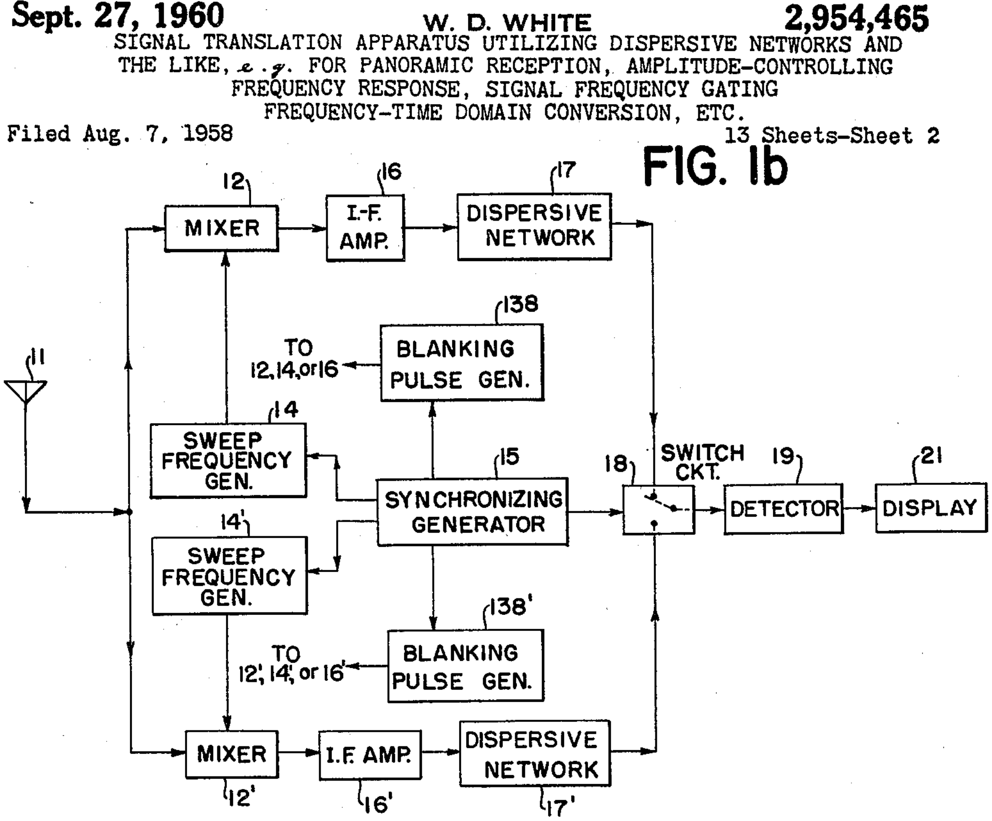
Figure 1C:
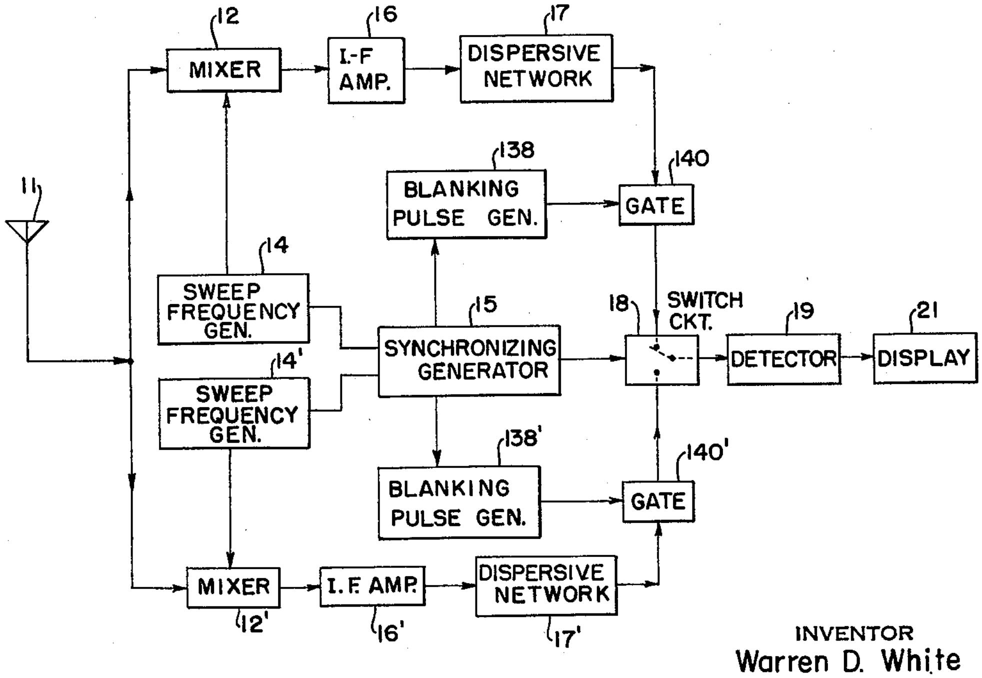

Referring now to Fig. 1, a panoramic receiver is shown in which signals picked up by an antenna 11 are supplied to heterodyne mixers 12 and 12' in respective channels. A suitable preselector 13 may be employed if desired, such as a broadly-tuned filter passing the entire R.-F. band to be covered, with or without amplification. The mixers are supplied with frequency sweeps from generators 14 and 14'.

Each generator generates a sweep output whose frequency varies repetitively over a selected range and, advantageously, the variation is linear with time followed by a quick return to the initial frequency, in sawtooth form. Such sweep generators are well-known. For example, a sawtooth voltage wave generator may be used to control a reactance tube in the tank circuit of an oscillator, or to vary the reflector voltage of a reflex klystron, or to vary the voltage of a backward wave oscillator, etc.

A synchronizing generator 15 controls generators 14 and 14' so that the respective sweep frequency outputs are similar but displaced in time to form a pair of interlaced frequency sweeps. For example, triggered sweep generators can be employed for 14 and 14', and generator 15 arranged to supply triggering pulses alternately thereto. If a sufficiently high sweep repetition frequency is employed, with a correspondingly short sweep period, a single sweep generator whose output is fed directly to one mixer and through a delay line to the other mixer may be used.

The beat frequency outputs of the two mixers are supplied to respective intermediate frequency amplifiers 16, 16' and respective cascaded dispersive networks 17, 17'. The outputs of the dispersive networks are supplied to a switch circuit 18 whose switching is controlled by the synchronizing generator 15. A simple single-pole, double throw switch is shown in dotted lines to facilitate understanding, but in practice a suitable electronic switch will commonly be employed. The output of the switch circuit is supplied to a detector 19 and thence to a suitable display device 21.

Before explaining the operation of the receiver of Fig. 1, dispersive networks will be described briefly. Such a network has the property of delaying low frequencies more than high frequencies, or vice versa. If, as in the present case, a signal whose frequency varies linearly with time is applied to the dispersive network, the network can be designed so that all frequencies arrive at the output at substantially the same time. For example, if the input is varying linearly from a low frequency to a high frequency, the dispersive network will be designed to delay the low frequencies more than the high frequencies progressively in a linear manner, so that all arrive substantially simultaneously at the output. If, on the other hand, the input signal is varying from high to low frequencies, the dispersive network will be designed to delay the high frequencies more than the low.

A number of types of dispersive networks are known and one form is illustrated in Fig. 1(*a*). Here a delay line 22 is fed with an input signal applied at 23, and the line is tapped at a number of successive points 24, 24', etc. corresponding to successively longer delays. Selective filters 25, 25', etc., tuned to pass adjacent narrow frequency bands, are placed in the tapped circuits. The outputs of the filters are connected to a common output line 26.

In practice, the total frequency band F which it is desired to cover may be divided into a number of narrower frequency bands $F_1$, $F_2$, etc. To delay low frequencies more than high, filter 25, corresponding to the shortest delay, is arranged to pass the highest frequency subdivision, say $F_1$. The next filter will pass the next subdivision $F_2$, and successive filters pass successively lower narrow bands until the entire band F is covered. On the other hand, to delay high frequencies more than low, the order of the filters is reversed.

The delays and narrow frequency bands are selected to correspond to the sweep rate of the applied signal, that is, the time rate of change of frequency. With a sufficient number of taps on the delay line and a corresponding number of filters, a substantially uniformly varying time delay over the entire frequency band F can be obtatined.

Figure 2:
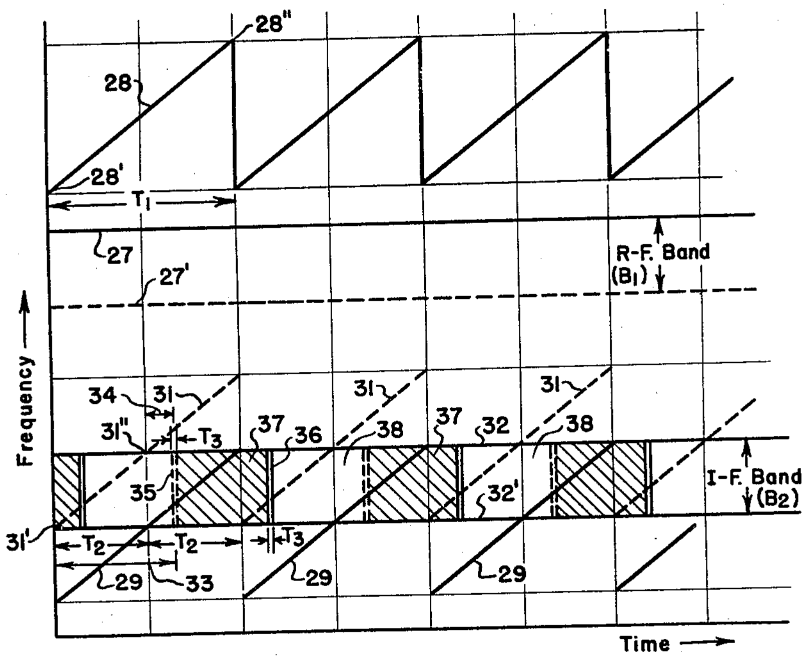

Referring now to Fig. 2, this graph illustrates the performance of one of the channels in Fig. 1, say the upper channel. Here the R.-F. band to be covered is between lines 27 and 27'. The frequency sweep from generator 14 is shown at 28 and progresses linearly from a lower limit 28' to a higher limit 28'' and then returns abruptly to its lower limit, ready for the next sweep. The sawtooth wave has a selected sweep repetition frequency and a corresponding sweep repetition period, the latter denoted $T_1$.

The locally generated frequency sweep may be above or below the R.-F. band, as is well understood, and is here shown above. In the mixer 12 the locally generated sweep is heterodyned with an input signal frequency to produce a beat frequency sweep which is the sum or difference of the instantaneous values of the sweep and input frequencies. The difference beat frequency sweep is commonly employed in panoramic receivers, as here shown, but in some applications of the invention the use of the sum may be preferable.

The beat frequency sweeps between sweeps 28 and the highest frequency 27 in the R.-F. band are shown by full lines 29. Similarly, the beat frequency sweeps corresponding to the lowest R.-F. frequency 27' are shown by dash lines 31.

The I.-F. channel is represented by lines 32, 32' and the corresponding bandwidth is denoted $B_2$. In this embodiment the I.-F. bandwidth $B_2$ is made equal to the R.-F. band $B_1$ which is to be covered. Also, the frequency range of the local oscillator sweep 28 is twice the I.-F. bandwidth. Consequently, the beat frequency sweep corresponding to a given input signal will lie within the I.-F. band for one-half the sweep repetition period $T_1$, and is ineffective for the remainder of the period. For example, the beat frequency sweep 29 is outside the I.-F. band during the first half of interval $T_1$ but within the band during the second half. On the other hand, beat frequency sweeps 31 is within the I.-F. band during the first half but outside during the second half. All other signals lying within the R.F. band $B_1$ will produce corresponding beat frequency sweeps lying between lines 29 and 31, so that they also will remain within the I.-F. band for only one-half the interval $T_1$.

It will therefore be seen that, due to the sweeping action, the output of the I.-F. amplifier 16 for a given R.-F. signal will consist of sweep frequency pulses recurring at the sweep repetition frequency and that, in this embodiment, the pulse durations (denoted $T_2$) will be one-half the sweep repetition period $T_1$. In each pulse the frequency is increasing linearly with time.

The output of the I.-F. amplifier 16 is supplied to a dispersive network 17 which delays the low frequencies more than the high. In Fig. 2, the lowest frequency 31' is delayed by the time interval denoted 33 and the highest frequency 31'' by the interval 34. By matching the delay dispersion in the dispersive network to the sweep rate of the signal 31, all frequency components within the interval $T_2$ arrive substantially simultaneously at the output of the dispersive network, as indicated by the dotted pulse 35. That is, knowing the slope of the beat frequency sweep 31, the dispersive network is designed so that each frequency thereof within the I.-F. passband is delayed by the proper amount to cause all frequencies to issue substantially simultaneously.

If the sweeps 28 were inverted, the beat frequency sweeps would likewise be inverted and would progress linearly from high to low frequencies. In such case the dispersive network would be designed to delay the high frequencies more than the low.

Actually in practice, the output pulses from the dispersive network cannot have an infinitesimally short duration. Even with a perfect dispersive network, the minimum duration of the output pulses is limited by the bandwidth of the circuits preceding the network. Assuming that the I.-F. bandwidth is the limiting factor, as is commonly the case, the duration of the output pulses, $T_3$, will be approximately the reciprocal of the I.-F. bandwidth. The sweep rate and the I.-F. bandwidth determine the length $T_2$ of the input pulses to the dispersive network. The ratio between the input and output pulses is termed the "compression factor."

Since in this embodiment the I.-F. bandwidth is equal to the R.-F. band to be covered, it will normally be quite wide and consequently very short pulses may be obtained from the dispersive network.

By referring the output pulse duration $T_3$ back to the sweep rate, the corresponding resolution bandwidth can be obtained. This resolution bandwidth is narrower than the I.-F. bandwidth by the compression factor. Thus a high degree of resolution can be obtained even though the I.-F. bandwidth is wide. For example, with a 100 megacycle I.-F. bandwidth and a compression factor of 100, a resolution of one megacycle can be achieved.

These relationships are explained somewhat more fully in my copending application Serial No. 710,210, supra.

Each incoming R.-F. signal produces its corresponding repetitive beat frequency sweeps, and corresponding repetitive output pulses will be obtained from the dispersive network 17. In Fig. 2 pulses 35 and 36 correspond to signals at the bottom and top of the R.-F. band, respectively. Pulses corresponding to all other signals within the R.-F. band $B_1$ will lie somewhere between pulses 35 and 36, in the shaded area 37. In the embodiment shown, each shaded area 37 covers a time interval which is one-half the sweep repetition period $T_1$. In the clear areas 38, lying between the shaded areas, no pulse output from the dispersive network 17 will be obtained for signals within the R.-F. band $B_1$, since these areas correspond to R.-F. frequencies outside this band.

It will be noted that there is a certain overall delay 34 between the highest frequency 31'' in the I.-F. band and the corresponding pulse 35 from the dispersive network. As will be apparent from Fig. 1(*a*), if filter 25 is designed to pass a narrow band of frequencies at the top of the I.-F. band and is connected to the input line 23, zero delay can be obtained. However, commonly the dispersive network will be designed to cover a somewhat greater frequency range than the I.-F. bandwidth so as to assure proper performance for all frequencies in the band. Thus an overall time delay 34 results, in addition to the delay dispersion between the frequency limits of the I.-F. band which in this embodiment gives a delay $T_2$. In a given application, the overall delay 34 can be made quite small if desired.

With the switch circuit 18 in the position indicated in Fig. 1, the output of dispersive network 17 is supplied to detector 19 and then to the display device 21. The display can take any desired form. One common type employs a cathode-ray tube with a horizontal time sweep synchronized with the local oscillator sweep, and the received signals deflect the cathode-ray beam in the vertical direction.

Figure 4:
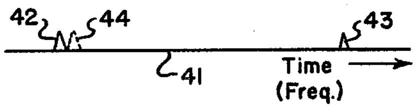
Fig. 4 illustrates one form of display presentation.

Such a display is shown in Fig. 4. The horizontal line 41 represents the horizontal trace which is synchronized with the sweep frequency generator 14. Although the intervals along the trace 41 are fundamentally units of time, they correspond directly to units of frequency because of the synchronization. Consequently, R.-F. signals of different frequency will appear at different points along trace 41. For example, a low frequency signal will result in a pulse 42 at the low end of the scale and a high frequency signal will result in a pulse 43 at the high end of the scale. The pulses on the display tube will ordinarily be somewhat rounded and perhaps somewhat irregular depending upon the receiver characteristics, so that no attempt is made here to reproduce exact shapes.

The width of the pulses 42, 43 is important to the resolution of the receiver. Thus, an adjacent pulse 44 cannot readily be discerned as a separate transmission if it overlaps pulse 42 too much. Inasmuch as the output pulses from the dispersive network may be made quite narrow, as above described, the corresponding pulses on the display of Fig. 4 will be quite narrow, thus providing good resolution.

As is well known, the reproduction of narrow pulses requires adequate bandwidth in the circuits through which they pass. Consequently the detector 19, the circuits in display device 21, and any amplifier employed should have adequate bandwidth to reproduce the narrow pulses issuing from the dispersive network 17.

Figures 3, 3A:
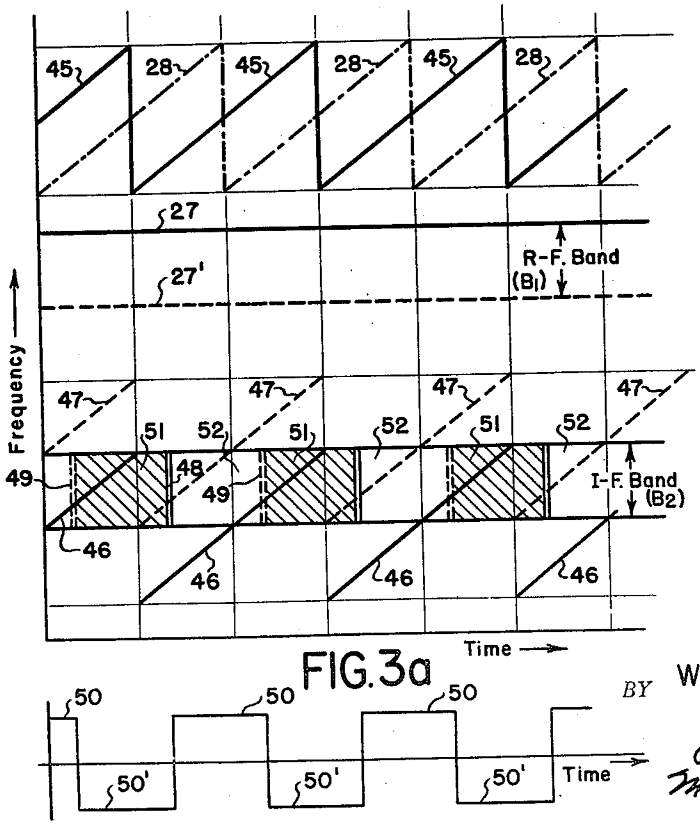

The lower channel in Fig. 1 is similar to the upper channel except that the frequency sweeps from generator 14′ are interlaced with those from generator 14. Referring to Fig. 3, the frequency sweeps 28 from generator 14 are here shown by dot-dash lines and the frequency sweeps 45 from generator 14′ are shown in full lines. It will be observed that sweeps 45 are interlaced with sweeps 28. The R.-F. and I.-F. bands are the same as in Fig. 2.

The beat frequency sweeps 46 and 47, corresponding to upper and lower R.-F. frequencies 27 and 27′, are produced in the manner described in connection with Fig. 2. Corresponding pulses 48 and 49 will appear at the output of the dispersive network 17′. Hence pulses corresponding to all frequencies in the R.-F. band $B_1$ will occur repetitively in the shaded areas 51.

By comparing Fig. 3 with Fig. 2, it is seen that the beat frequency sweeps in the two channels corresponding to a given input signal are interlaced in time. Thus beat frequency sweeps 29 and 46 corresponding to input signal 27 are interlaced, and sweeps 31 and 47 corresponding to signal 27′ are interlaced. The same will be true for all other signals in the R.-F. band $B_1$. Also, as the beat frequency sweep for a given signal passes out of the I.-F. passband in the upper channel, the corresponding beat frequency sweep enters the I.-F. passband in the lower channel. Thus the signal passes to the dispersive network in one or the other channel at all times, without time gaps.

It is further seen that the shaded areas 51 in Fig. 3 correspond in time to the clear areas 38 of Fig. 2, and vice versa. Consequently, for a signal of given frequency corresponding output pulses will issue from dispersive networks 17 and 17′ alternately. For example, R.-F. signal 27 yields pulses 36 and 48 alternately in the two channels, R.-F. signal 27′ yields pulses 35 and 49 alternately in the two channels, etc.

The pulses corresponding to a given input signal will recur at the interlaced sweep repetition frequency which, for double-interlaced sweeps as shown in Fig. 3, will be twice the repetition frequency of either of the sweeps 28 and 45. The interval between successive pulses in the two channels will be that of the interlaced sweep period. This is the time interval between corresponding portions of successive interlaced sweeps 28 and 45 and hence, for double interlacing, is one-half $T_1$.

The outputs of the two channels are supplied alternately by switch circuit 18 to the detector 19 and display device 21. The switching is controlled by synchronizing generator 15 in synchronism with the interlaced sweeps and with an appropriate time delay so that the upper channel is effective during the shaded intervals 37 in Fig. 2, and the lower channel during shaded intervals 51 in Fig. 3. This is shown in Fig. 3(*a*), wherein lines 50 represent the intervals switch 18 is in its upper position, connecting the output of the upper channel to the detector 19, and lines 50′ represent the intervals the switch is in its lower position, connecting the lower channel to the detector.

Since the times during which the two channels will respond to signals within the R.-F. band $B_1$ are contiguous, with fast switching corresponding outputs to the display device will be obtained from one or the other channel at all times for all signals. Thus, the receiver is always wide open to the reception of signals throughout the R.-F. band $B_1$, regardless of when they occur, thus providing continuous coverage. However, the signals may still be separately displayed in accordance with their frequency.

If the display is like that shown in Fig. 4, the time base 41 will repeat at the interlaced sweep repetition frequency. Thus, each video pulse 42–44 will be reproduced alternately by the two channels. Due to the operation of the dispersive networks, each video pulse represents signal information gathered throughout an interlaced sweep period.

Figure 5:
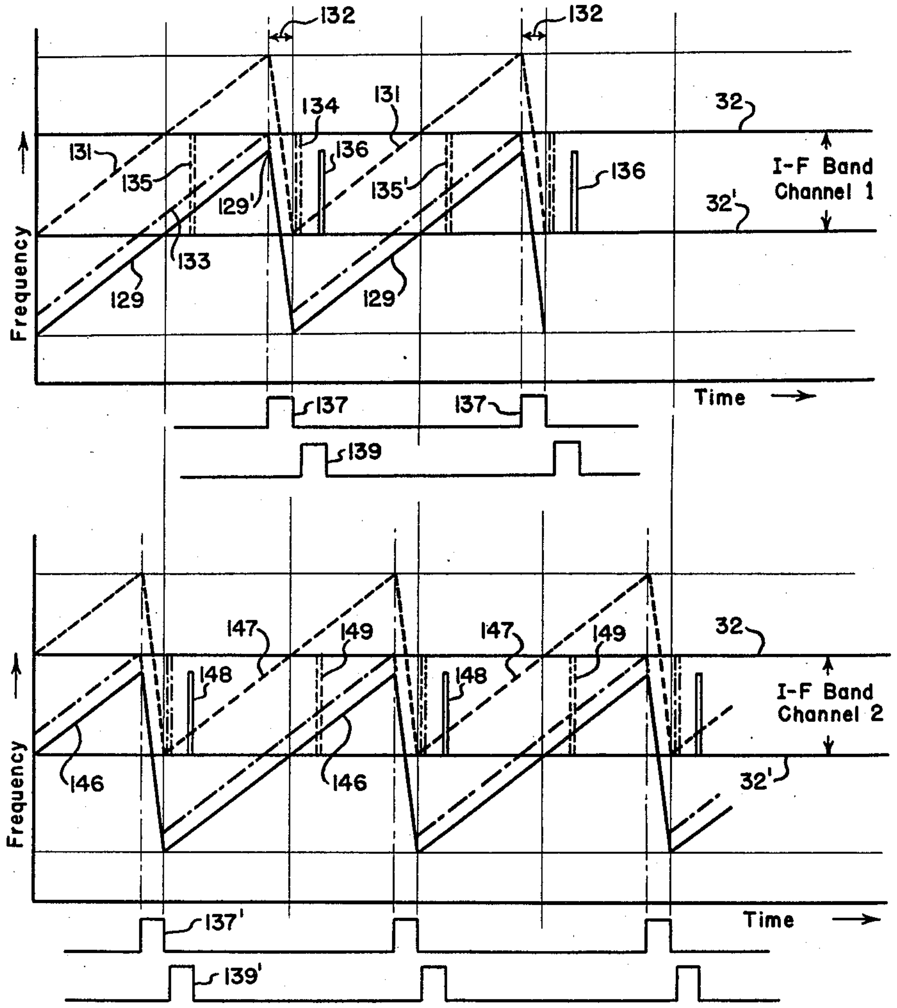
Fig. 5 is a graph explanatory of operation with finite frequency retrace intervals.

In some applications it may be difficult or impossible to obtain a sufficiently fast frequency retrace for it to be negligible. Fig. 5 explains certain factors involved in such case.

Referring to Fig. 5, the portions of Figs. 2 and 3 illustrating the beat frequency sweeps in the two channels are depicted, except with finite retrace intervals. The I.-F. bands in the two channels are indicated by lines 32, 32′ as before.

Considering first channel 1 of Fig. 5, beat frequency sweeps 129 and 131 have the same sweep rate as corresponding beat frequencies 29 and 31 of Fig. 2, but the sweep frequency range is somewhat less due to the retrace intervals 132. Since the effective portion of beat frequency sweep 131 (within the I.-F. band) is the same as in Fig. 2, corresponding pulses 135 from the dispersive network 17 will be the same as pulses 35 in Fig. 2.

However, the portion of beat frequency sweep 129 within the I.-F. band does not reach the upper limit of the band, but begins its retrace at point 129′. Consequently, the corresponding pulse 136 from the dispersive network does not represent as wide a range of frequencies as the corresponding pulse 36 in Fig. 2, and will give a somewhat wider video pulse. Also, there will be a short time gap in the reception of the highest frequency signal, represented by the interval 132.

An R.-F. frequency somewhat below the upper limit of Fig. 2 will give a beat frequency sweep, as shown at 133 in Fig. 5, which just reaches the upper limit of the I.-F. band before retrace begins. Consequently, the corresponding pulse 134 from the dispersive network 17 will have full resolution.

If it is desired to maintain equal resolution over the entire R.-F. band to be covered, without any time gaps, the R.-F. band can be restricted to a range somewhat narrower than the I.-F. band, so that the highest R.-F. freqency gives a beat frequency sweep which traverses the entire I.-F. band before retrace. In many cases, of course, the decrease in resolution for the highest R.-F. frequencies and the small time gaps in the reception thereof will be unimportant.

Another aspect of finite retracts intervals is that, for a given R.-F. signal, the retrace traverses the I.-F. band at a different time from the sweep. In many cases this will be unimportant since the retrace will commonly be much steeper than the sweep. With the dispersive network matched to the sweep rate, it will not be matched to the retrace rate and hence will not produce a well-defined pulse at the output of the dispersive network. In general signal energy received in the retrace intervals will be spread out in time, and may often be unobjectionable.

It it is desired to avoid this interference, channel 1 may be gated out ahead of the dispersive network during the retrace intervals 132. For example, pulses 137 may be generated by a blanking pulse generator 138 shown in Fig. 1(*b*). This generator is shown synchronized by the generator 15 so that the blanking pulses occur in proper phase with the frequency sweeps from generator 14. The blanking pulses may be applied to blank the output of sweep frequency generator 14, or mixer 12, or I.-F. amplifier 16, as indicated.

Instead of restricting the R.-F. band to equalize resolution over the received band and insure continuous coverage, the output of the dispersive network may be gated so that all pulses corresponding to signals of higher frequency than pulse 134 are eliminated. This may be accomplished by generating blanking pulses 139 in the blanking generator 138 of Fig. 1(*c*) and applying them to gate 140, as indicated.

The lower portion of Fig. 5 representing channel 2 is similar to the upper portion, except that the respective beat frequency sweeps and the pulses from the dispersive network 17′ are interlaced with those in channel 1. If blanking pulses 137 and/or 139 are employed in channel 1, corresponding pulses 137′ and 139′ may be employed in channel 2. These may be developed by the blanking pulse generator 138′ in Figs. 1(*b*) and 1(*c*), and utilized as described for channel 1.

By comparing upper and lower portions of Fig. 5, it will be apparent that, even with frequency retrace times which are a substantial fraction of the sweep repetition period, and without restricting the R.-F. acceptance band or blanking as above described, the lower and middle R.-F. frequencies are covered continuously, without time gaps, and with equal resolution. Only the highest R.-F. frequencies have time gaps in the response and somewhat lower resolution. The faster the retrace, the shorter such time gaps and the more equal the resolution.

If the local oscillator sweeps 28, 45 in Figs. 2 and 3 were inverted, or if the sweeps shown were tracking below the R.-F. signal, low R.-F. frequencies would be affected by finite retrace times rather than high R.-F. frequencies, as will be understood.

From Figs. 2 and 3 it will be apparent that if the R.-F. band $B_1$ were wider than that shown, and other conditions remained the same, the shaded areas 37 and 51 would be longer than one-half the sweep period $T_1$, and the clear areas 38, 52 correspondingly less. Thus, the shaded areas in the two channels would overlap in time. If both channels were connected to the detector 19 during the overlap intervals, video pulses corresponding to relatively high and relatively low frequency R.-F. signals could exist simultaneously in the detector output, with consequent confusion of signals at the display device.

In Fig. 1 such overlap is prevented by switching the outputs of the channels alternately to the detector, as described. Accordingly, it is unnecessary to limit the incoming R.-F. signals to the band shown in order to prevent overlap, although a preselector 13 could be employed to take care of finite retrace times as above described, or for image frequency rejection or other purposes, if desired.

Instead of switching, overlap of the response intervals in the two channels can be avoided by limiting the bandwidth of the incoming R.-F. signals. In such case a single I.-F. amplifier and dispersive network can be used in common in the two channels. Such an arrangement is shown in Fig. 6.

Figures 6, 7:
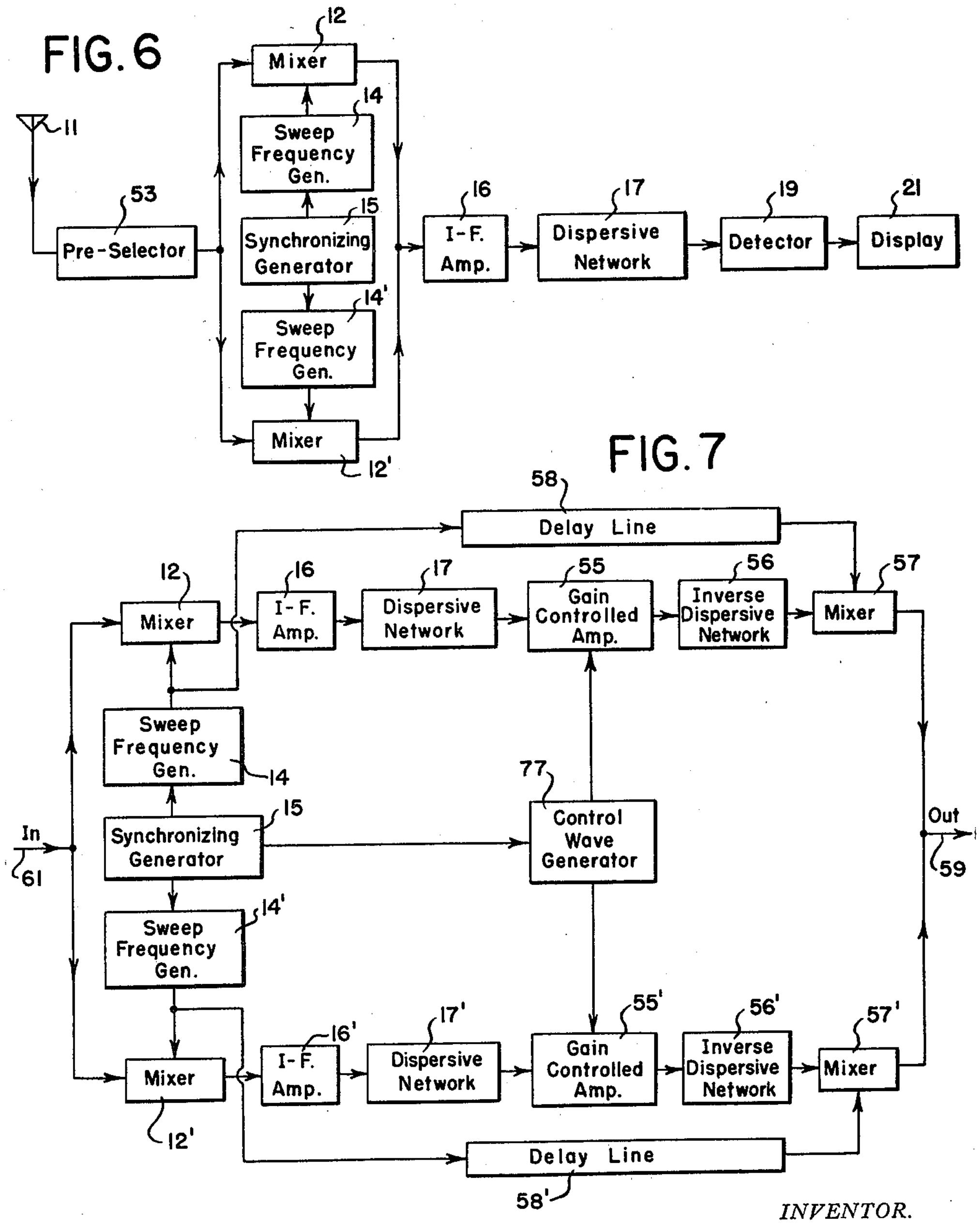
Fig. 6 is a modification of the receiver of Fig. 1.
Fig. 7 shows signal translation apparatus whose frequency response is controlled by waves in the time domain.

Referring to Fig. 6, the preselector 53 has a bandpass characteristic which limits the R.-F. signals fed to mixers 12, 12′ to a band not exceeding the width of the frequency band traversed by a frequency sweep 28, 45 (Figs. 2, 3) in an interlaced sweep period. With double interlacing, the interlaced sweep period is $\frac{1}{2}T_1$. In Figs. 2, 3 and 5, this frequency band is equal to the bandwidth of the I.-F. channels. Since the I.-F. bandwidth is traversed by a beat frequency sweep in an interlaced sweep period, this insures that the shaded areas in Figs. 2 and 3 will not be longer than an interlaced sweep period. Consequently there will be no overlap in the response of the two channels.

Figs. 2–5 apply also to Fig. 6, and the applicability will be clear by keeping in mind that channel 1, including mixer 12, I.-F. amplifier 16 and dispersive network 17, comprises like-numbered components in both Figs. 1 and 6. Channel 2 in Fig. 1, including 12′, 16′ and 17′, corresponds to mixer 12′, amplifier 16 and network 17 in Fig. 6, since the latter two components are in common to the two channels. The blanking described in connection with Fig. 5 may be applied to Fig. 6 in generally the same manner as in Figs. 1(*b*) and 1(*c*). However, blanking the I.-F. amplifier 16 in Fig. 6 during retrace intervals will commonly not be desirable since it would be at the interlaced sweep frequency in order to blank out retraces in both channels, and hence the blanking of the retrace in one channel would blank out a portion of the sweep in the other. On the other hand, blanking the output of the dispersive network 17 in Fig. 6 at the interlaced sweep frequency can be employed since the pulses in the two channels occupy mutually exclusive time intervals due to the input bandwidth restriction.

Other detailed arrangements are possible. For example, in Fig. 1 individual detectors may be placed in the two channels and the outputs combined at the display. In Fig. 6, individual I.-F. amplifiers may be used for the two channels with a common dispersive network. In either figure, similar preselectors can be placed in the two channels, instead of a common preselector, and separate antennas can be employed for the two channels.

Instead of placing the dispersive networks after the I.-F. amplifiers, they may be placed ahead thereof or between stages thereof with similar results. For some applications it may be possible to design the amplifier so that it also produces the required dispersion.

In some cases it may be desired to use the output signals for control purposes, rather than supplying them to a visual display device. In such case the detector may be appropriately selected for the type of operation required.

As illustrated in Figs. 2 and 3, with double interlacing it is preferred to employ an I.-F. bandwidth which is substantially one-half the sweep frequency range of the local oscillators, with very fast retrace. With this relationship the R.-F. band covered is substantially equal to the I.-F. bandwidth when fast switching is employed, as in Fig. 1, and only a moderate reduction in R.-F. bandwidth results with the arrangement of Fig. 6. Also, the receiver is wide open to receive signals in any part of the R.-F. band at all times.

While this is preferred, it is possible to depart therefrom where the requirements of a particular application permit. For example, the sweep frequency range may be made less than twice the I.-F. bandwidth and satisfactory operation obtained, although the R.-F. band covered will be reduced. In this case, without input bandwidth limitation, the shaded areas 37 and 51 in Figs. 2 and 3 will be greater than an interlaced sweep period. However, with the switching arrangement of Fig. 1, the effective operation of each channel is confined to an interlaced sweep period, so that low frequency signals from one channel will not interfere with high frequency signals from the other channel. In the arrangement of Fig. 6, operation will also be satisfactory if the preselector filter 53 is made sufficiently narrow to limit the effective outputs of each channel to alternate time intervals which do not overlap, that is, do not exceed an interlaced sweep period.

Some loss in available resolution may result when the sweep range is less than twice the I.-F. bandwidth inasmuch as the full I.-F. bandwidth may not be utilized. For example, if the sweep frequency range is equal to the I.-F. bandwidth in the arrangement of Fig. 1, the R.-F. band covered will be one-half that shown in Fig. 2 and the resolution of the pulses out of the dispersive network will correspond to one-half the I.-F. bandwidth. The same will be true of the arrangement of Fig. 6 if the preselector 53 is designed with a bandwidth equal to one-half the I.-F. bandwidth, or somewhat less, to avoid interfering signals in the detector output.

If, on the other hand, the sweep frequency range is more than twice the I.-F. bandwidth, for double interlacing, an R.-F. band can be covered which is correspondingly greater than the I.-F. bandwidth. In such case there may be time gaps in the reception of a signal of given frequency, since the beat frequency sweep for a given signal will pass out of the I.-F. passband of one channel before the corresponding beat frequency sweep in the other channel enters its I.-F. passband.

The R.-F. and I.-F. bandwidths, the sweep range and other parameters may be correlated to meet the requirements of a particular application. Generally, in order to avoid time gaps in the reception of individual signal frequencies, it is desirable to make the bandwidth of the circuits between each mixer and the dispersive network, and the bandwidth of the dispersive network itself, at least as wide as the width of the frequency band traversed by a frequency sweep in an interlaced sweep period. Then, switching of channels at the interlaced sweep repetition frequency in general suffices to avoid interference between channels. If an input filter is employed to avoid such interference, its bandwidth should in general not exceed the frequency band just specified.

For maximum resolution with a given I.-F. bandwidth, without time gaps, in general the sweep rate should be selected so that the sweep traverses approximately the full I.-F. bandwidth in an interlaced sweep period. This same relationship will also, in general, give maximum R.-F. band coverage without time gaps.

Although an I.-F. amplifier will commonly be employed in each channel, or in common with the channels, to obtain adequate gain, in some cases they may be omitted if desired.

Fig. 7 illustrates an embodiment of the invention in which the frequency response can be varied by control waves in the time domain. It will be noted from Figs. 2 and 3 that in each channel input signals of different frequency are converted into corresponding pulses spaced in time in accordance with the signal frequencies. That is, in each channel frequency domain relationships are transformed into time domain relationships. In accordance with the present invention, these time domain relationships can be reconverted into frequency domain relationships. When this is done, it is then possible to change or alter the frequency domain relationships by operations performed in the time domain.

Referring to Fig. 7, a signal translation device is shown having two channels each including a mixer, I.-F. amplifier, dispersive network and sweep frequency generator, and a synchronizing generator 15 is employed to maintain the interlaced relationship. These components function in the same manner as in Fig. 1, and bear like numbers. The graphs in Figs. 2, 3 and 5 also apply in the same manner, and the description thereof need not be repeated. Blanking of sweep frequency generators 14, 14′, or mixers 12, 12′, or I.-F. amplifiers 16, 16′ during finite retrace intervals may be obtained by generating blanking pulses 137, 137′ (Fig. 5) with blanking pulse generators as described in connection with Fig. 1(*b*).

In each channel the output of the dispersive network is supplied through a gain-controlled amplifier 55, 55′ to an inverse dispersive network 56, 56′. If it is desired to gate the outputs of the dispersive networks as described in connection with Fig. 1(*c*), the gain-controlled amplifiers 55, 55′ can be used as gates, with gate pulses 139, 139′ (Fig. 5) supplied thereto either from blanking pulse generators 138, 138′ as in Fig. 1(*c*), or from the control wave generator 77.

The inverse dispersive network has a delay dispersion complementary to that of the dispersive network, and functions to receive input pulses from the dispersive network and transform them into corresponding frequency sweeps similar to those originally supplied to the dispersive network. The operation of converting an input frequency sweep extending over an interval of time $T_2$ into a much shorter output pulse of duration $T_3$ has already been described. If the frequency sweep varies from low to high frequencies, the low frequencies are delayed more than the high. It will be recognized that the short output pulses contain all the frequency components of the input, but they occur substantially simultaneously rather than being spread out in time. If, now, a similar network is designed which delays the high frequencies more than the low, and is supplied with the short pulses, the frequencies in each pulse will be spread out in time and the resulting output of the inverse dispersive network will be substantially the same as the original input to the dispersive network. In the type of network shown in Fig. 1(*a*), the inverse dispersive network may be obtained by reversing the order of the narrow band filters $F_1$, $F_2$, etc.

Returning to Fig. 7, and disregarding the gain-controlled amplifiers 55, 55′ for the moment, the outputs of the inverse dispersive networks 56, 56′ will be substantially the same as the inputs to dispersive networks 17, 17′ and these outputs are supplied to respective heterodyne mixers 57, 57′. The original sweep frequencies from generators 14, 14′ are supplied through respective delay lines 58, 58′ to the mixers. With proper selection of the delays, the combined output of mixers 57, 57′ in the output line 59 will be substantial replicas of the input signals in line 61.

Instead of feeding the original sweeps through delay lines to mixers 57, 57′, a pair of additional sweep frequency generators similar to 14, 14′ and synchronized by generator 15 in proper phase to produce the delayed sweeps may be employed.

Before considering the effect of the gain-controlled amplifiers 55, 55′, Fig. 8 will be described so that the operation of the circuit will be clear. Assume that there are several input signals 62–66 coming in line 61 in Fig. 7. These are here assumed to be in the R.-F. frequency range, but, as will be referred to later, they can be in other ranges in particular applications. Sweep frequency 28 is produced by generator 14 in the upper channel, and sweep frequency 45 by generator 14′ in the lower channel, and correspond to those shown in Figs. 2 and 3. Line 45 is shown dashed and corresponding signals in the other portions of the apparatus are shown dashed to indicate that they are produced in the lower channel of Fig. 7.

Each input signal produces a corresponding beat frequency sweep 62′–66′ in the upper channel, as described before. The portions of the input signals shown by dash lines produce corresponding beat frequency sweeps 62″–66″ in the lower channel. Subsequent portions of the input signals produce beat frequencies in the upper and lower channels alternately, as will be understood.

Upon passing through the dispersive networks 17, 17′, corresponding output pulses 67–71 will be obtained in the upper channel, and pulses 67′–71′ in the lower channel. As here shown, input signals 62 and 66 have a frequency difference equal to the I.-F. bandwidth so that beat frequency sweeps 66′ and 62″ occur simultaneously and corresponding pulses 71 and 67′ occur simultaneously. If the input signal bandwidth is slightly less than the I.-F. bandwidth, there will be a slight separation in time between the beat frequency sweeps and pulses just named.

A large overall delay between the frequency sweep inputs to the dispersive networks and the pulse outputs therefrom is here assumed, as shown by the time interval between, say, the end of beat frequency sweep 62′ and the corresponding pulse 67, so that the pulse pattern will not overlay the beat frequency sweep pattern and become confusing. In actual practice, much shorter delays will ordinarily be employed, as indicated in Figs. 2 and 3.

Assuming for the moment that the gain-controlled amplifiers 55, 55′ provide uniform gain at all times, the pulses will be supplied to the inverse dispersive networks 56, 56′ and their frequencies spread out in time. Thus, pulse 67 at the input of inverse dispersive network 56 will produce a corresponding frequency sweep 72 at the output thereof. Succeeding pulses 68–71 will produce corresponding frequency sweeps 73–76 in the upper channel. In the lower channel pulses 67′–71′ will produce corresponding frequency sweeps 72′–76′. If the delay dispersion is the same but of opposite slope in the dispersive and inverse dispersive networks, that is, complementary, the frequency sweeps 72–76 and 72′–76′ will be substantial replicas of the initial beat frequency sweeps 62′–66′, 62″–66″. Here again, the overall delay between the input and output of each inverse dispersive network is shown comparatively large to avoid confusion in the drawing, but in practice will ordinarily be relatively small.

As pointed out in describing Fig. 7, the initial frequency sweeps are supplied through delay lines 58, 58' to the mixers 57, 57' along with the outputs of the inverse dispersive networks. In Fig. 8 the delayed sweeps are shown at 28' and 45'. The delay is here selected so that the beat frequencies between the delayed sweeps 28', 45' and the signals 72–76, 72'–76' will correspond to the initial input signal frequencies, respectively, indicated by lines 72''–76''. As shown, the delayed sweep 28' starts at the same time as sweep 72 so that the difference frequency 72'' in the output of mixer 57 is the same as the initial input signal 62. Subsequent sweeps 73–76 in the upper channel will beat with the sweep frequency 28' to give the portions of output signals 73''–76'' shown in full lines. Immediately thereafter, corresponding sweeps 72'–76' will beat with the delayed sweep 45' in the lower channel to give the dashed portions of corresponding output signals.

It will therefore be apparent that the output signals in line 59 of Fig. 7 will be substantial replicas of the input signals in line 61, but somewhat delayed in time depending upon the total delays in the two channels.

Considering now the effect of the gain-controlled amplifiers 55, 55', it will be observed that the pulses 67–71 occur successively in time, but the pulses correspond to different input signal frequencies. The energy of the pulses cannot be shown in Fig. 8, since it is a frequency-time graph, but it will be understood that the energy in each pulse will correspond to the energy in the corresponding input signal frequency. If, then, the gain of amplifier 55 is changed, the energy in the output signals in line 59 will be changed.

Accordingly, a control wave source, shown as generator 77 in Fig. 7, is provided to alter the gain of amplifier 55 as a function of time. This produces corresponding changes in the amplitude of different frequency components in the output line 59. The control wave generator 77 is synchronized by generator 15 and phased so that the control waves therefrom are delayed with respect to the sweep frequency oscillator 14 and alter the gain of amplifier 55 synchronously with the occurrence of pulses at the output of dispersive network 17. Similarly, control wave generator 77 controls the gain of amplifier 55' in the lower channel, and the control waves to the two channels will alternate at the interlaced sweep repetition frequency.

Figure 8:
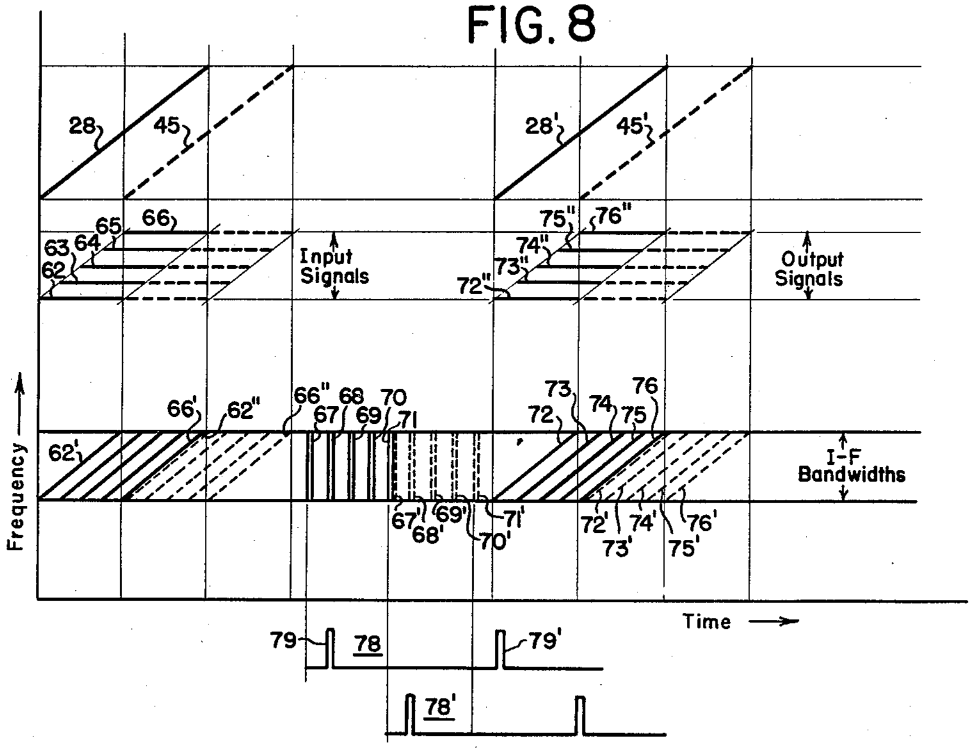
Fig. 8 is a graph explanatory of the operation of Fig. 7.

For example, suppose that it is desired to eliminate all signals except that corresponding to input signal 63 in Fig. 8. Control wave generator 77 will then be designed to cut off amplifier 55 at all times except during the interval when pulse 68 (corresponding to input signal 63) issues from dispersive network 17, and during corresponding intervals in subsequent sweeps. Such a control wave is shown at 78 in Fig. 8. Pulse 79 is in effect a gating pulse which allows amplifier 55 to pass signal pulse 68 to the inverse dispersive network 56, but cuts off the amplifier during the remainder of the cycle. A subsequent pulse 79' occurring one cycle later again opens the upper channel to a pulse corresponding to the same input signal 63.

In the lower channel, a similar control wave 78' is supplied to amplifier 55', but the pulses are interlaced with those in 78 so that the same input signal frequency 63 is allowed to pass through the lower channel.

As pointed out before, many forms of control waves whose amplitude varies with time can readily be produced by apparatus known in the art. Generator 77 may be designed to produce any desired waveform to produce a corresponding change in the frequencies allowed to pass through to the output line 59.

Figure 9:
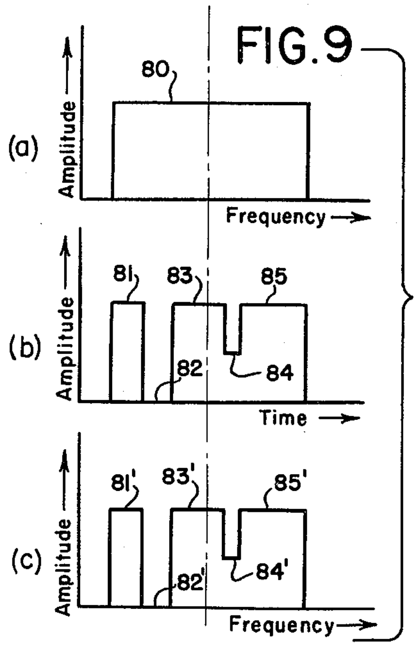
Figs. 9 and 10 show illustrative uses of the apparatus of Fig. 7.

Fig. 9 gives another example of such control. Fig. 9(*a*) represents the overall frequency passband 80 of the circuit. Fig. 9(*b*) shows a control waveform whose amplitude varies with time during an interlaced sweep period. At 81 a passing pulse is shown which allows a low frequency band of signals to pass to output line 59, as indicated at 81' in Fig. 9(*c*). The control wave is then reduced to zero at 82 to cut off amplifier 55. Consequently, the frequencies corresponding to this time interval are prevented from passing, as shown at 82'. Another passing portion 83 allows a middle band of frequencies 83' to pass. Then the control wave changes to a value 84 which reduces the gain of amplifier 55 but does not cut it off. Consequently, the amplitude of the signal frequencies corresponding to this time interval are reduced as shown at 84'. The control wave then returns to full amplitude 85 to pass the remaining higher frequencies as shown at 85'.

A control wave like that shown in 9(*b*) but delayed in time by ½ $T_1$ is supplied to the lower channel amplifier 55' during the next interlaced sweep period so that the frequencies in the lower channel will be altered in the same manner as those in the upper channel.

Figure 10:
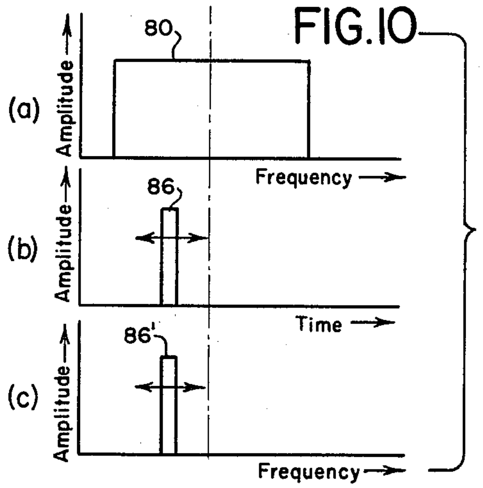

Fig. 10 shows another example in which the control wave generator 77 supplies a repetitive passing pulse 86 whose time occurrence can be varied in either direction at the will of the operator. Suitable variable pulse-gating circuits are well-known in the art. By changing the time occurrence of pulse 86 in the interlaced sweep periods, a different band of frequencies can be allowed to pass through to output line 59, as shown at 86'.

It will therefore be seen that the arrangement of Fig. 7 enables the frequency passband characteristic to be changed in any desired manner by the application of suitable amplitude-time control waveforms so that a wide variety of passband characteristics can readily be obtained. Furthermore, the passband characteristic can be changed quickly by merely changing the control waveform.

In the embodiment of Fig. 7, as in previous embodiments, suitable precautions should be taken to prevent signals from the two channels from interfering in the output line 59. An input filter can be introduced in the input line 61 as described in connection with Fig. 6, or the two channels may be rendered effective alternately by gating or switching circuits.

Gate or switch circuits can be introduced between dispersive and inverse dispersive networks 17, 56 and 17', 56' and controlled by suitable waves synchronized by generator 15. However, since gain-controlled amplifiers 55, 55' are already present, they may be employed for this function. Thus, the control waves from generator 77 to the amplifiers 55, 55' may be arranged to cut off each channel during alternate interlaced sweep periods.

On the other hand, if a filter is employed to restrict the input signal bandwidth, in some cases identical control waves recurring at the interlaced sweep repetition frequency may be applied to amplifiers 55, 55', since pulses will be supplied to each amplifier from the corresponding dispersive network only during alternate interlaced sweep periods.

It will be understood that amplifiers 55, 55' may be designed to provide normal gains greater or less than unity, as desired, since it is the change of gain which is employed for control purposes.

As in the case of Fig. 1, the arrangement of Fig. 7 can be modified to employ a number of components in common in the two channels. One such arrangement is shown in Fig. 11.

Figure 11:
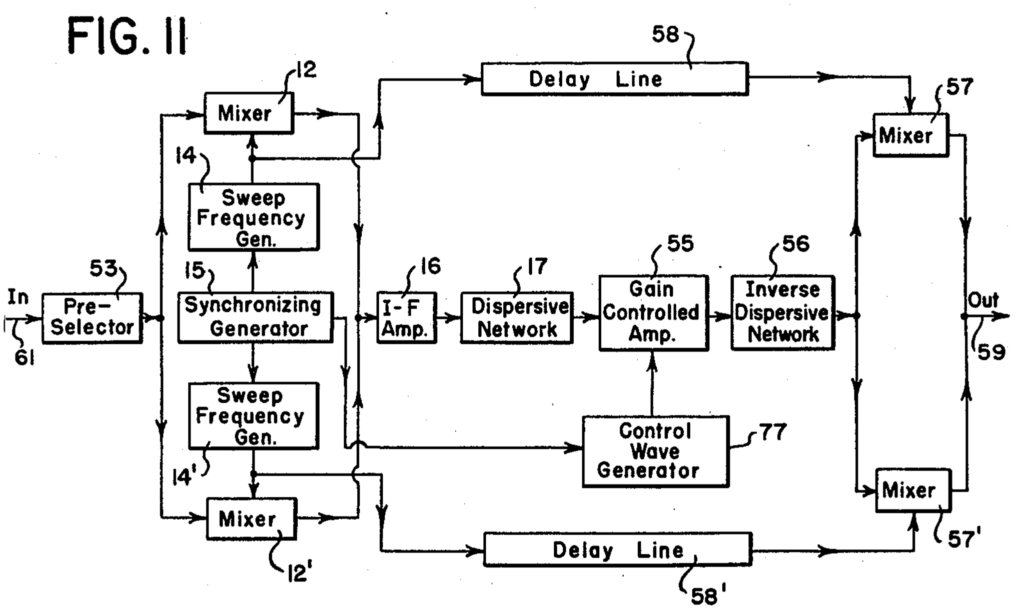
Fig. 11 illustrates a modification of the apparatus of Fig. 7.

Referring to Fig. 11, I.-F. amplifier 16, dispersive and inverse dispersive networks 17, 56 and gain-controlled amplifier 55 are employed in common in the two channels. One channel includes the common elements and mixers 12 and 57. The other channel includes the common elements and mixers 12' and 57'. The preselector 53 has a passband which restricts the bandwidth of the incoming signals so that the output pulses from dispersive network 17 corresponding to beat frequency sweeps from mixers 12, 12′ occupy substantially mutually exclusive time intervals. This has been explained hereinbefore.

The graph of Fig. 8 applies also to the circuit of Fig. 11 and the general operation will be clear therefrom. However, certain aspects may be discussed briefly.

In Fig. 11 the control wave generator 77 is arranged to supply control waves to gain-controlled amplifier 55 which recur at the interlaced sweep repetition frequency. Selected pulses in both channels are fed from dispersive network 17 to inverse dispersive network 56, and corresponding selected sweeps will be fed from network 56 to both mixers 57, 57′. Even though the outputs of mixers 57, 57′ are connected directly to output line 59, no interference between channels will ordinarily arise. In mixer 57 the sweeps 72–76 beat with the delayed sweep 28′ to produce the portions of output signals 72″–76″ shown in full lines, as before. Sweeps 72′–76′, however, will beat with the delayed sweep 28′ to produce frequencies outside the band occupied by output signals 72″–76″. Similarly, in mixer 57′ the delayed sweep 45′ will beat with sweeps 72′–76′ to produce corresponding signals within the output signal band, but the beat frequencies corresponding to sweeps 72–76 will lie outside that band. If desired, a filter can be inserted in output line 59 to exclude frequencies lying outside the desired band.

Blanking and gating as discussed in connection with Fig. 7 may also be applied to the arrangement of Fig. 11, except that it is undesirable to blank the I.-F. amplifier 16 for the reasons given in connection with Fig. 6.

The embodiments of Figs. 7 and 11 are capable of modification for many different purposes. For example, the gain-controlled amplifier and control wave generator can be replaced by other types of signal transmission means which modify the pulses from the dispersive network. While intentional modification is particularly contemplated and is considered extremely valuable, in some cases it may be desired to use the arrangements in connection with signal transmission means which inherently modify signals passing therethrough, for example, where distortion of the signals in the time domain may not result in as serious signal impairment as distortion of the signals in the frequency domain.

The employment of a plurality of channels and interlaced sweeps in apparatus for controlling frequency response, as illustrated in Figs. 7 and 11, is preferred since continuous coverage throughout the input signal band is possible. However, for many applications short time gaps in the reception of signals may be permissible. In such case arrangements like that shown in Fig. 12 may be employed.

Figure 12:
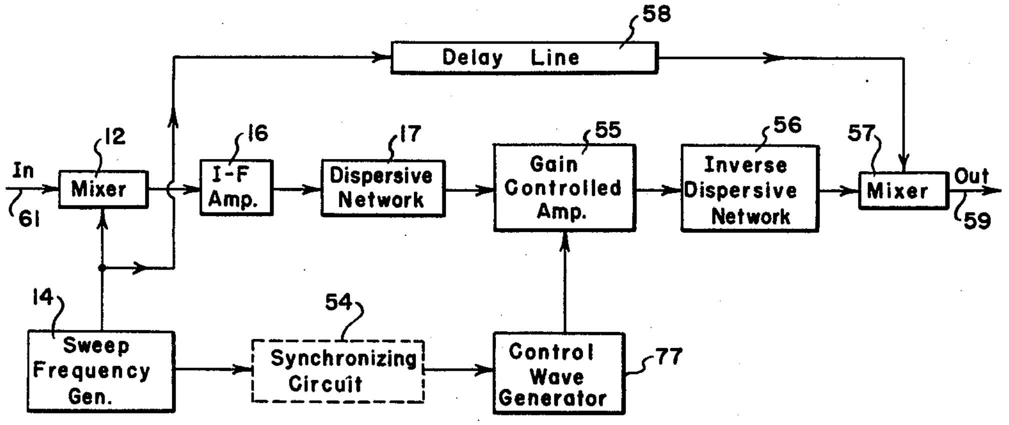
Fig. 12 illustrates a different arrangement of apparatus of controllable frequency response.

Referring to Fig. 12, an arrangement is shown which is similar to one channel of Figs. 7 or 11. Only one sweep frequency generator 14 is employed and it may be self-oscillating or triggered by a synchronizing circuit 54. The control wave generator 77 may be synchronized by circuit 54, or by pulses from the sweep generator 14. The arrangement of Fig. 12 is capable of two types of operation, depending upon the detailed design of the components. These will be explained in connection with Figs. 13 and 14.

Figure 13:
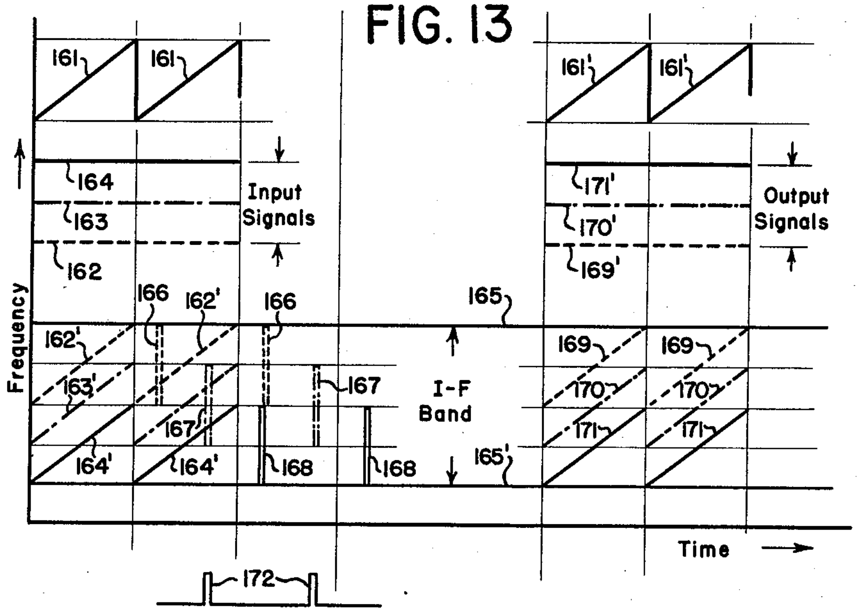
Figs. 13 and 14 illustrate two types of operation with the arrangement of Fig. 12.

Fig. 13 is a graph explaining operation of the arrangement of Fig. 12 when the I.-F. bandwidth is substantially greater than the frequency range of the sweeps from generator 14. Generally speaking, the I.-F. bandwidth is at least equal to the sweep frequency range plus the desired input signal bandwidth.

The frequency sweeps from generator 14 are shown at 161 and the input signal bandwidth extends from a lower limit 162 to an upper limit 164, a signal at the middle of the band being designated 163. The I.-F. band lies between lines 165, 165′ and the components between mixer 12 and mixer 57 in Fig. 12 are designed to handle this bandwidth.

The frequency sweeps 161 and the input signals beat together to form corresponding beat frequency sweeps 162′, 163′ and 164′. In this embodiment each beat frequency sweep lies wholly within the I.-F. bandwidth, but different sweeps occupy different portions of the band.

The dispersive network 17 is designed to have a delay dispersion matching the sweep rate between frequency limits 165 and 165′. Usually it will be designed for a somewhat wider band to insure proper operation within the band. Accordingly, short output pulses 166–168 will be produced by the dispersive network 17 corresponding to beat frequency sweeps 162′–164′. For continuous signals, pulses 166–168 will have similar durations and frequency range, but will occupy different portions of the I.-F. frequency spectrum, as indicated. These pulses are applied to the inverse dispersive network 56 to form corresponding sweeps 169, 170 and 171, similar to the beat frequency sweeps 162′–164′. The frequency sweeps 161 from generator 14 are supplied through a delay line 58 to mixer 57, and the delayed sweeps are shown at 161′. These delayed sweeps beat with sweeps 169–171 in mixer 57 to form corresponding output signals 169′, 170′, 171′. These are similar to input signals 162–164.

To alter the frequency response, control waves from generator 77 are supplied to the gain-controlled amplifier 55 to alter the relative amplitudes of pulses 166–168 while they are in the time domain. For example, if it is desired to pass only the mid-frequency signal 163, the control wave generator 77 may be designed to generate pulses 172 which gate the amplifier 55 on during the pulses and off during the intervals therebetween. Thus, only signal 170′ will appear in the output circuit 59.

With an instantaneous retrace, the output signals will be as indicated in Fig. 13, without substantial time gaps. However, with finite retrace times, there will be corresponding short gaps in the output signals. To avoid interference from signals outside the desired input acceptance band, an input filter may be employed.

In some applications it may be feasible to employ a sweep repetition frequency which is sufficiently higher than the modulation of the input signals so that the resultant sampling at frequent intervals suffices. The apparatus of Fig. 12 is adaptable to this type of operation, as illustrated in Fig. 14.

Figure 14:
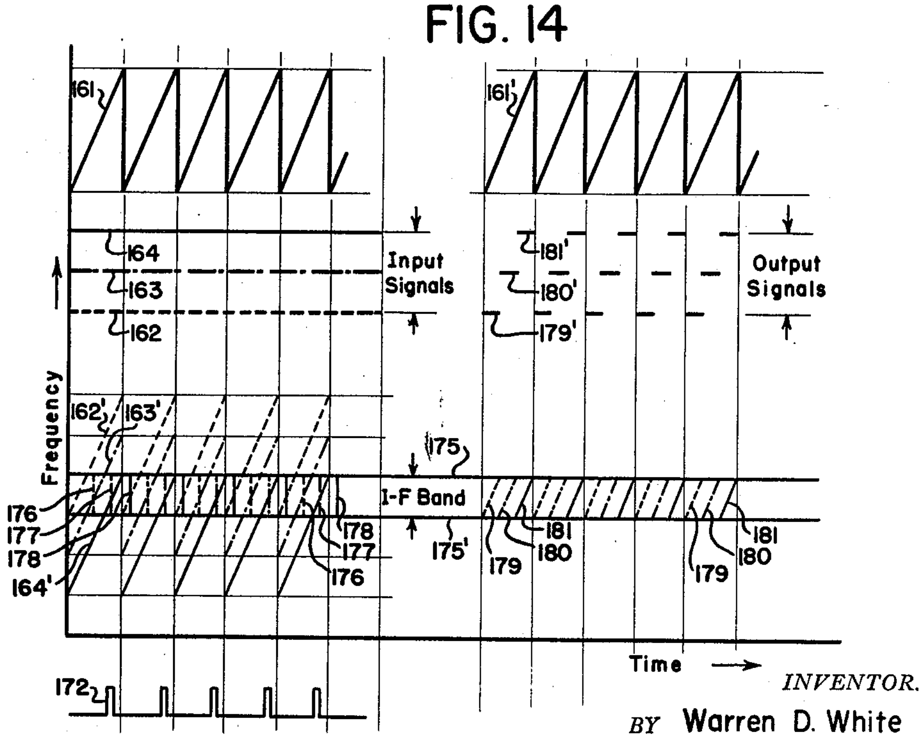

In Fig. 14 the sweeps from generator 14, the input signals and the beat frequency sweeps are numbered to correspond with those of Fig. 13. The frequency range of the sweeps is made larger to facilitate illustration. Here, an I.-F. band is shown as extending between frequency limits 175, 175′ and is considerably narrower than the frequency range of sweeps 161. Consequently, beat frequency sweeps 162′–164′ will remain within the I.-F. band for only a fraction of the sweep period and corresponding pulses 176, 177 and 178 will appear at the output of the dispersive network 17. These pulses will be applied to the inverse dispersive network 56 to produce sweeps 179, 180, 181. The delayed sweep 161′ will beat with sweeps 179–181 in mixer 57 to produce corresponding output signals 179′, 180′, 181′.

It will be noted that each of the output signals has time gaps therein. However, if the frequency of the successive portions of a given output signal is sufficiently high with respect to the modulation frequency of the signal, satisfactory operation may be obtained for many purposes.

In order to change the frequency characteristic, suitable control waves from generator 77 are applied to amplifier 55 as described before. For example, if only the mid-frequency signal 163 is to be passed, pulses 172 will be supplied to amplifier 55 to pass only pulses 177 therethrough.

Instead of altering the gain of an amplifier in the channel or channels to control the relative response for signals of different frequency, it is also possible to modify the apparatus of Figs. 7, 11 and 12 to obtain what may be termed a frequency-by-frequency limiter.

Figure 15:
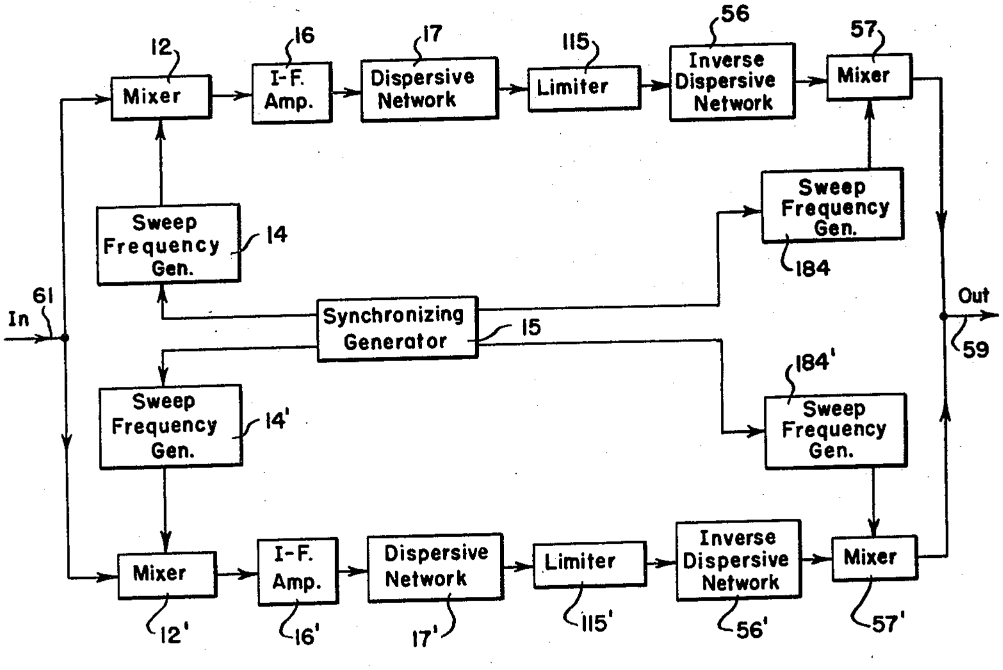
Fig. 15 illustrates a frequency-by-frequency limiter and Figs. 16*a* and 16*b* show graphs explanatory thereof.

Fig. 15 shows such an arrangement. Here, limiters 115, 115' are employed as the amplitude control means in the two channels. The limiters may be of any known type capable of limiting the amplitude of an applied signal to a desired maximum level. As has already been explained in discussing Figs. 7 and 8, the energy in the pulses from the dispersive networks will vary with the energy in the corresponding signals. Thus, the amplitude of the pulses will likewise vary. When these are applied to the inputs of limiters 115, 115', large amplitude pulses are limited to a predetermined level while smaller amplitude pulses pass freely through the channels. Accordingly, the output signal in line 59 has frequency components like those in the input signal at line 61, but large amplitude frequency components are limited to a selected level.

Figure 16A:
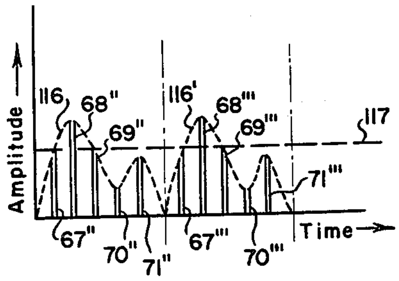
Figure 16B:
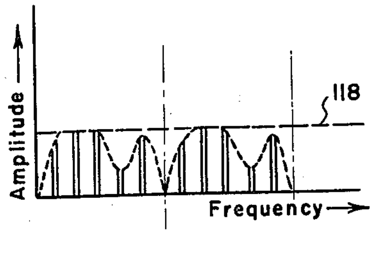

Fig. 16 illustrates this operation. Here pulses 67–71 and 67'–71' of Fig. 8 are assumed to be of different amplitude and are plotted on an amplitude-time basis as corresponding pulses 67''–71'', 67'''–71'''. In Fig. 16(*a*) pulses 71'' and 67''' corresponding to upper and lower signal frequency limits in the two channels are shown somewhat separated in time, for clarity of illustration. If the arrangement is used to receive transmitted signals, discrete signal frequencies will usually be present, as shown in full lines. However, the arrangement can be used with other types of signals having a continuous frequency spectrum such, for example, as shown by the dotted envelopes 116, 116'.

If the amplitudes of any of the pulses exceed the threshold of limiters 115, 115', they will be limited to a substantially fixed height, as shown by line 117. Thus, the relative amplitudes of the pulses will be altered so that no pulse exceeds a predetermined amplitude. The resulting output in line 59 is shown in Fig. 16(*b*) where large amplitude frequency components are limited to a value represented by line 118.

Limiters may also be used in the arrangements of Figs. 11 and 12 in place of the gain-controlled amplifier 55, and the control wave generator 77 omitted.

Fig. 15 also shows an alternate to the use of delay lines mentioned before. Here, separate sweep frequency generators 184, 184' are used to supply sweeps to mixers 57, 57'. They are synchronized from generator 15 so that corresponding portions of the sweeps are delayed with respect to those from generators 14, 14'. If desired, delay lines can be employed in the arrangement of Fig. 15, or the delay lines shown in Figs. 7, 11 and 12 may be replaced by sweep frequency generators.

Figure 17:
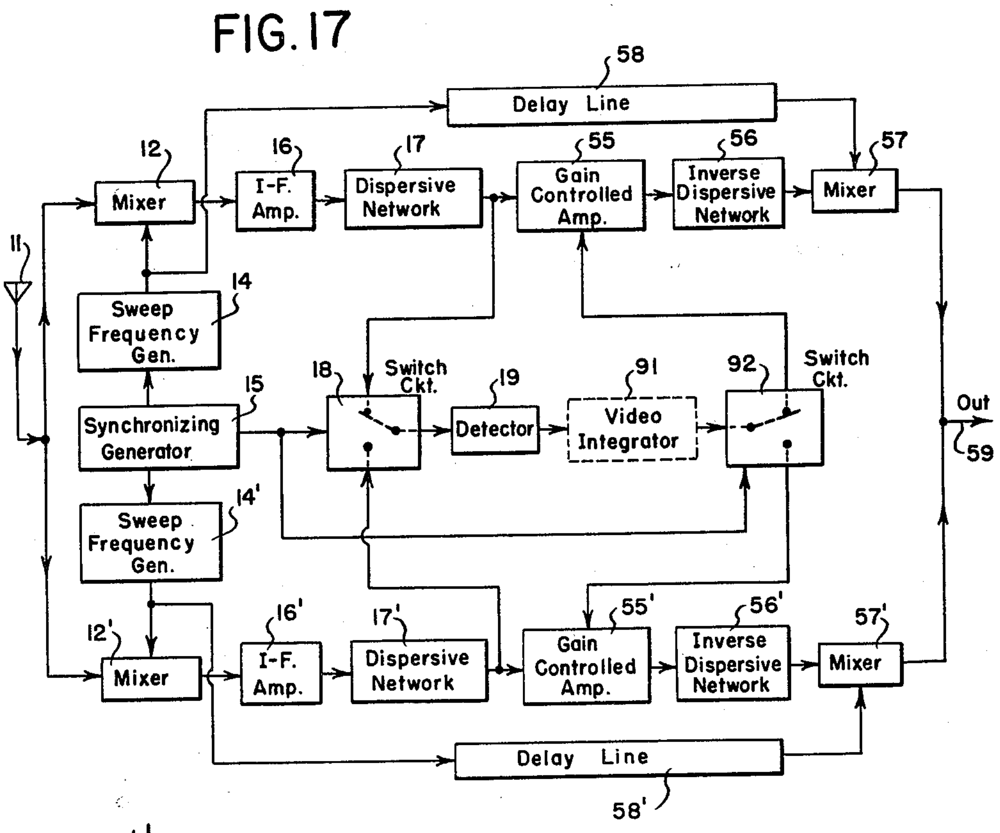
Fig. 17 illustrates a panoramic receiver in which the frequency band is controlled by the incoming signals, and Fig. 17(*a*) shows a detail thereof.

Fig. 17 shows a radio monitoring receiver of the invention incorporating a variable frequency response circuit controlled by the received signals. The input circuit from antenna 11 and the channels through dispersive networks 17, 17', switch circuit 18 and detector 19 are similar to those shown in Fig. 1 and need not be described again. The outputs of the dispersive networks are also supplied through gain-controlled amplifiers 55, 55' and inverse dispersive networks 56, 56' to mixers 57, 57' in the manner shown in Fig. 7. However, in this figure the output of detector 19 is used to control the gain of amplifiers 55, 55' to alter the passband of the receiver in the manner described below. The output at line 59 contains signals similar to the input signals from antenna 11, but of modified relative amplitude.

A display device may be connected to the output of detector 19 in Fig. 17 in the manner shown in Fig. 1, so that the input signals can be exhibited before their relative amplitudes have been modified. The output signals in line 59 may be supplied to subsequent mixer, I.-F. amplifier, detector and display stages either following conventional practice or as shown in Figs. 1 and 6, for example. Or, other types of utilizing apparatus may be connected to receive the output.

The output of detector 19 may be used directly to control the passband characteristic, or may first be passed through suitable processing circuits. For example, a video integrator 91 as shown in dotted lines may be used.

Disregarding for the moment the integrator 91, the output of detector 19 is supplied to a switch circuit 92 whose switching is controlled by the synchronizing generator 15 so that the output of the detector is supplied alternately to the upper and lower channels during their effective operating periods. The detected output will have video pulses corresponding to received signals such as shown, for example, in Fig. 4. These pulses may be used to gate amplifiers 55, 55' on during the occurrence of the received signals, the amplifiers being cut off for the remainder of the time. As a result, the passband characteristic is continuously adjusted to pass the frequencies of the signals actually received, and to cut out the other portions of the frequency band. If there is an appreciable delay in detector 19, corresponding delays can be introduced between the dispersive networks and amplifiers 55, 55'.

Considering now the effect of the video integrator 91, this may be of known type which integrates or averages each received signal over several successive interlaced sweep periods. This is often desirable since a given signal may be pulsed or coded so that there are time gaps in the transmission. By averaging the signal over a period of time, more effective control of the passband characteristic is possible.

One form of video integrator is shown in Fig. 17(*a*). Here the input to amplifier 87 is from detector 19 (Fig. 17) and the output of the amplifier passes through a delay line 88 to an output line which is connected to switch 92 (Fig. 17). The delay in line 88 is made equal to the interval between successive pulses corresponding to a given signal, which here is the interlaced sweep period.

The output of delay line 88 is also connected to the input of amplifier 87. Accordingly, a pulse applied to amplifier 87 will be repeatedly fed back from the output of the delay line to the input of the amplifier. The loop gain is commonly slightly less than unity so that self-oscillations are not produced. Thus a single input pulse will produce a train of successively smaller pulses in the output line. However, if a series of pulses corresponding to a given signal frequency are fed into the amplifier 87, corresponding output pulses will build up to a large amplitude. Upon cessation of the input pulses, the pulses in the output line gradually decay at a rate determined by the time constant of the circuit. Due to the integrating action, brief interruptions in the transmission will produce very little effect, but if the signal ceases the integrated output will gradually decay to zero.

Figure 18:
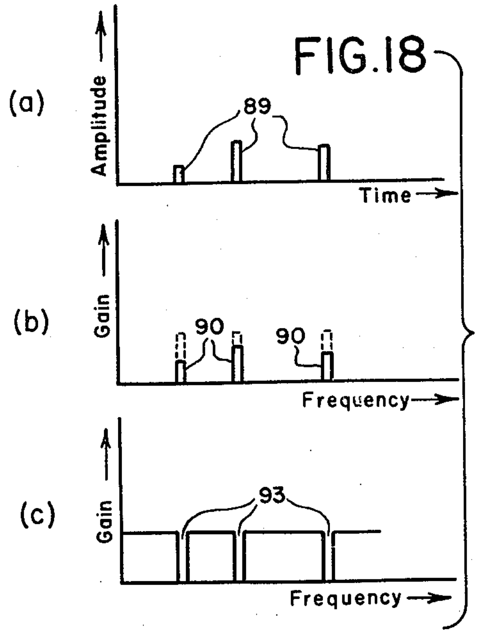
Fig. 18 shows graphs explanatory of the operation of the apparatus of Fig. 17.
Figure 17A:
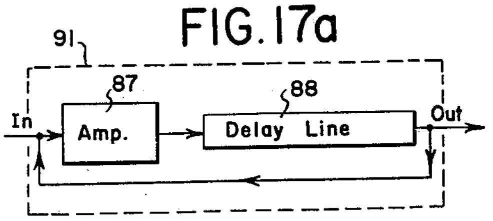

Fig. 18 illustrates the manner in which the apparatus of Fig. 17 operates. Suppose that the signals out of the detector 19 or video integrator 91 are as shown at 89 in Fig. 18(*a*) for a single interlaced sweep period, and repeat during successive periods. When they are applied alternately to the two channels, the overall passband to output line 59 will then be altered so as to pass only signals of corresponding frequency, as shown at 90 in Fig. 18(*b*). Rather than attenuating weak signals, the amplitude of the signals from the detector 19 or integrator 91 may be made sufficient to gate the channels fully on for received signals above a given level, as shown by the dotted lines in Fig. 18(*b*). In either case the overall passband will automatically be adjusted to the received signals.

Another operation can be performed which may be advantageous in many cases. If there are a number of signals on the air substantially continuously, it may be desired to eliminate these persistent signals so as to render new signals more apparent. With the video integrator 91 in circuit, this can be accomplished by employing the pulses of Fig. 18(*a*) to cut off amplifiers 55, 55', leaving the amplifiers on during the remainder of the intervals. Only simple changes are required, such as reversing the phase of the output of integrator 91 or making appropriate changes in the gain-controlled amplifiers.

The resulting frequency passband characteristic will then be like that shown in Fig. 18(*c*). Here signals which have persisted long enough to build up to a high level in integrator 91 are eliminated by cutting off the amplifiers in the corresponding intervals 93. The arrival of a new signal of different frequency will pass through to the output line 59 until it has persisted long enough to build up to the selected high level in the integrator 91. When a signal ceases, the corresponding portion of the frequency passband reopens, ready for a new transmission on the same frequency.

If desired, more sophisticated processing of the detected signal may be employed to obtain suitable control waveforms to apply to amplifiers 55, 55'.

Figure 19:
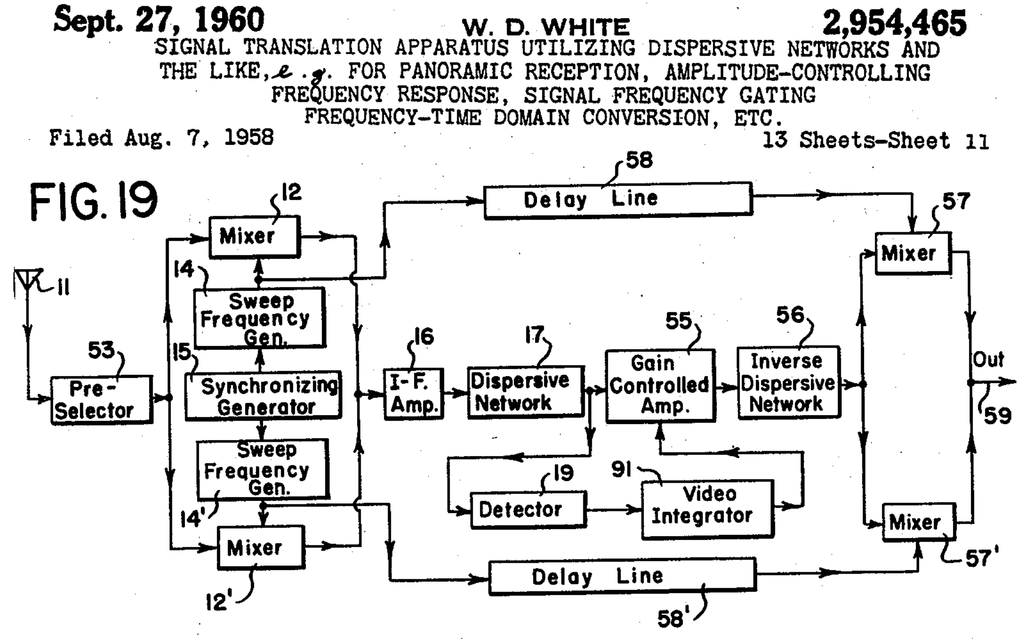
Fig. 19 illustrates a modification of the receiver of Fig. 17.

Fig. 19 shows an arrangement similar to Fig. 17 but employing a number of elements in common in the two channels, and using an input preselector 53 to limit the input bandwidth. The operation of Fig. 19 will be understood from the previous discussion of Figs. 6 and 11. Single channel operation either with a wide I.-F. channel or a high sweep repetition frequency, as described in connection with Figs. 12–14, may also be employed if desired.

In some cases, particularly in monitoring operations, it may be desirable to provide, in addition to a broad band panoramic or guard receiver, a narrow band receiver which picks out a single signal for detailed analysis. While two separate receivers can be employed for this purpose, there is a problem of correlating the tuning of the narrow band receiver with what is seen on the panoramic display, and also a problem of tuning the narrow band receiver quickly to the desired frequency. The arrangement shown in Fig. 20 is free from these difficulties.

Figure 20:
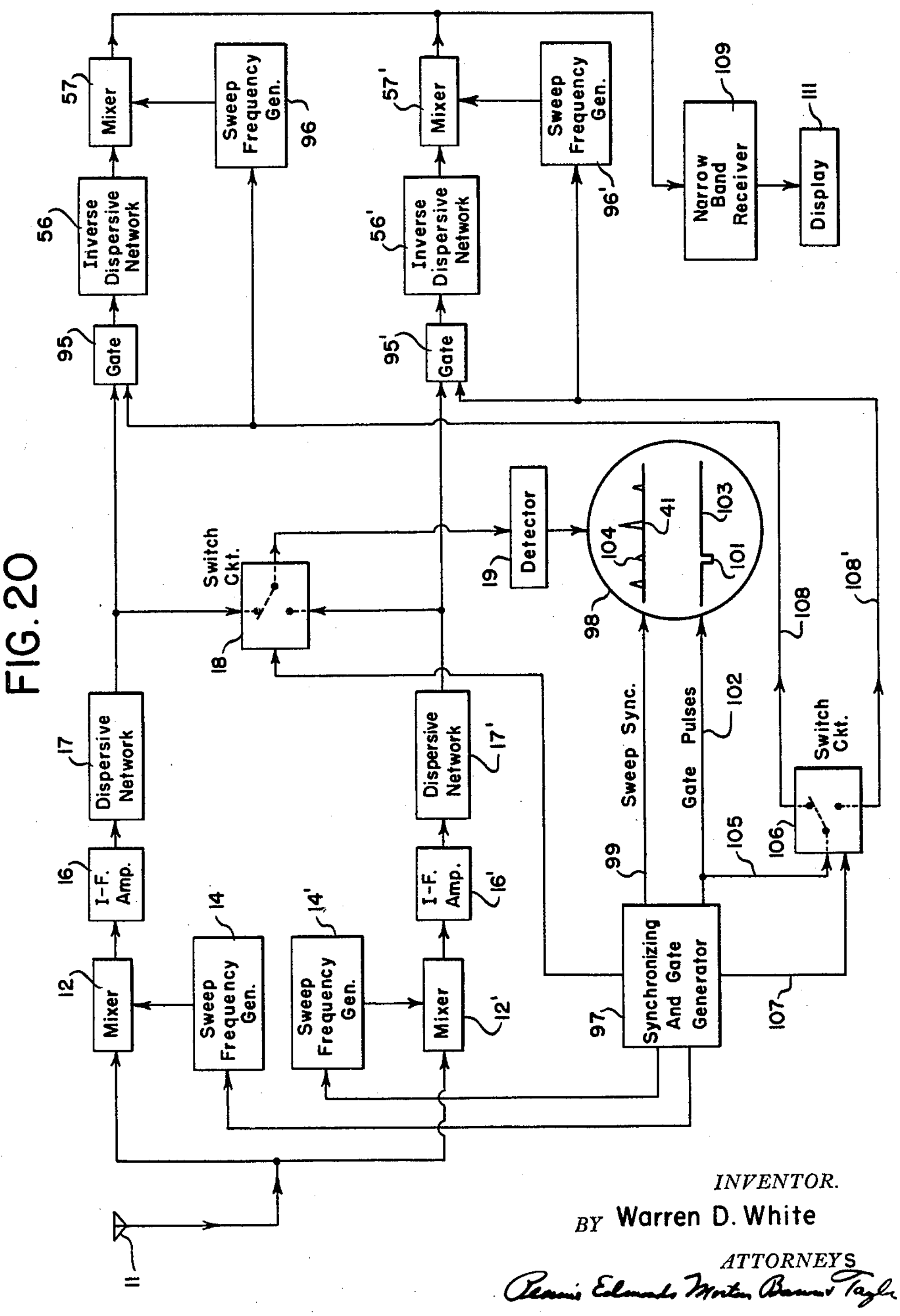
Fig. 20 illustrates a panoramic receiver with provision for analysis of a selected signal.

In Fig. 20, portions of the two channels similar to Fig. 17 are similarly numbered. Here the gain-controlled amplifiers are indicated as gate circuits 95 and 95', since it is desired to switch the channels between fully on and fully off conditions in response to gating pulses. The delay lines of Fig. 17 are replaced by sweep frequency generators 96, 96' for a reason which will be explained later. The synchronizing and gate generator 97 performs the functions of the synchronizing generator 15 in Fig. 17 in that it controls the sweep frequency oscillators 14, 14' and switch circuit 18. In this embodiment, however, it has additional functions.

The output of detector 19 is supplied to a suitable display device which is here shown as a cathode-ray tube display device 98 adapted to display received signals along trace 41, as previously described in connection with Fig. 4. The synchronization of the sweep is controlled by generator 97 in the manner described before, and a connection between the generator and display device is shown at 99.

Generator 97 also supplies repetitive gate pulses 101 to a separate vertical deflection circuit in display device 98 through line 102. The pulse recurrence frequency is equal to the horizontal display sweep frequency, and hence to the interlaced sweep repetition frequency. The cathode-ray tube may be of the double beam type with a pair of simultaneously deflected horizontal traces and with provision for separately deflecting the two beams in the vertical direction. To supply the gate pulses, generator 97 includes a gate pulse generator designed so that the time occurrence of the pulses 101 may be moved anywhere along the trace 103. Such circuits are well-known in the art. By moving the gate pulse 101 along the trace 103, it may be made to register vertically with any received signal which it is desired to analyze in detail. As shown, gate pulse 101 registers with received signal 104.

The repetitive gate pulses are also supplied through line 105 to a switch circuit 106 whose switching is controlled by generator 97 through line 107. Switch circuit 106 will ordinarily be of the electronic type, as mentioned before, and its switching will be synchronized with the alternate operation of the upper and lower channels.

The gate pulses are supplied alternately through lines 108, 108' to the gate circuits 95 and 95' so that the inverse dispersive networks 56, 56' are supplied only with pulses from the dispersive networks corresponding to the signal 104 which is picked out. In the inverse dispersive networks the signal pulses are reconverted to frequency sweeps, as already described in connection with Fig. 8, and these frequency sweeps are supplied to mixers 57, 57', respectively. The outputs of the mixers are supplied to a narrow band receiver 109 and thence to a display device 111 of any desired type for analysis purposes.

In order to avoid the necessity of tuning the narrow band receiver 109 to the signal picked out by the gate pulses 101, provision is here made to convert any selected signal frequency to a substantially fixed frequency within the reception band of receiver 109. To this end, the sweep frequency generators 96, 96' are triggered by the gate pulses in lines 108, 108' so that the outputs of mixers 57, 57' are always at a given frequency to which receiver 109 will respond.

Figures 21, 22:
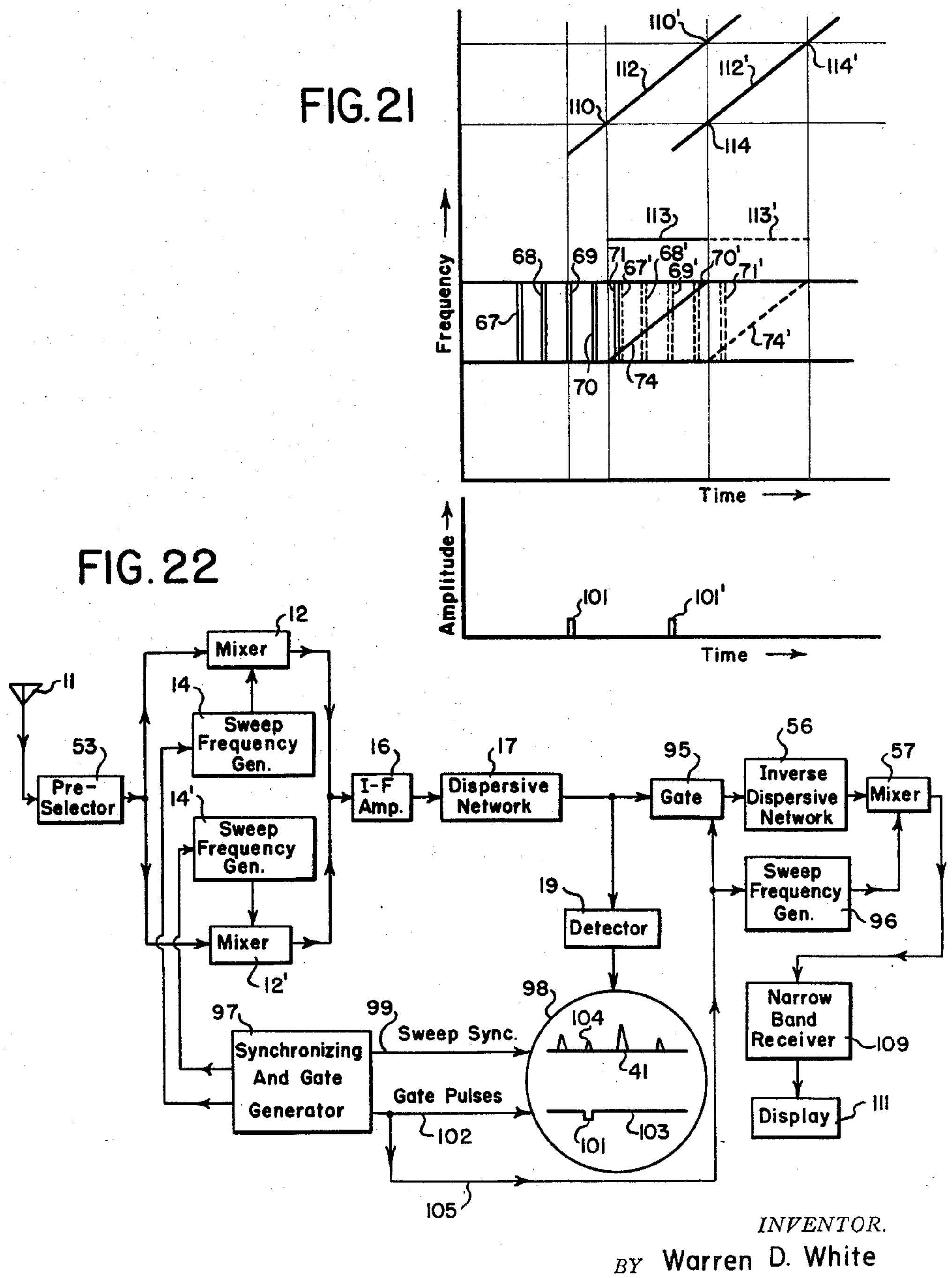
Fig. 21 is a graph explanatory of the receiver of Fig. 20.
Fig. 22 illustrates a modification of the receiver of Fig. 20.

The operation will be clearer by reference to Fig. 21. Here pulses 67–71 and 67'–71' represent pulses out of dispersive networks 17, 17', as already described in connection with Fig. 8. The gate pulses 101, 101' to respective channels are timed to select the signals represented by signal pulses 69, 69' and pass them on to the inverse dispersive networks. The outputs of the inverse dispersive networks will then be frequency sweeps corresponding to the selected signal, as shown by lines 74, 74'. This also has been explained in connection with Fig. 8, but here much shorter delays between the inputs and outputs of respective inverse dispersive networks are shown, since this corresponds more closely to what would commonly be employed in practice and the graph is not unduly complicated.

Pulses 101, 101' also trigger sweep frequency generators 96, 96'. The resulting frequency sweeps are shown at 112, 112' and have a fixed phase with respect to the gate pulses. These sweeps have the same slopes (sweep rates) as the frequency sweeps from generators 14, 14', but their frequency range may be higher or lower in the frequency spectrum in order to produce an output signal from mixers 57, 57' of desired frequency.

As here shown, when the sweeps 112 and 74 are supplied to mixer 57, a resulting output signal 113 of predetermined frequency is obtatined. Similarly, when frequency sweeps 112' and 74' are applied to mixer 57', an output signal 113' of the same predetermined frequency is produced. If the gate pulses 101, 101' are moved to pick out some other received signal, say 70, 70', the triggered sweeps 112, 112' will be displaced to the right by the amount necessary to produce the same predetermined frequency represented by 113, 113'. Thus, it is unnecessary to tune the narrow band receiver 109 when different signals are selected by gating pulses 101, 101'.

It will be noted from Fig. 21 that only the portions 110—110' and 114—114' of the frequency sweeps of oscillators 96 and 96' are used in producing the fixed frequency signal 113—113'. Since these portions form a sawtooth wave, with sufficiently fast retrace from 110' to 114 a single oscillator 96 could be employed for both mixers 57 and 57'. Inasmuch as points 110 and 114 are delayed in time with respect to the triggering gate pulses 101 and 101', respectively, due to the overall delay in the inverse dispersive networks, a corresponding delay could then be inserted in the triggering line to the oscillator 96. For example, the gate pulses in line 105 (Fig. 20) could be supplied to oscillator 96 through a delay line, oscillator 96 connected to supply both mixers 57 and 57′, and oscillator 96′ eliminated. Mixers 57 and 57′ would still function alternately, since signals are supplied thereto alternately by gates 95 and 95′.

The apparatus of Fig. 20 can also be modified to employ a number of components in common in the two channels. Such an arrangement is shown in Fig. 22. Here the preselector 53 limits the input signal bandwidth so that pulses in the output of dispersive network 17 which correspond alternately to beat frequency sweeps from mixers 12 and 12′ occupy mutually exclusive time intervals. Accordingly, only a single gate 95 need be employed and it is actuated by gate pulses 101 through line 105 at the interlaced sweep repetition frequency. Also, only a single sweep frequency generator 96 and a single mixer 57 need be employed, since for a narrow selected signal band the mixer functions alternately for the two channels. If there is substantial overall delay in the inverse dispersive network 56, a delay line can be placed in the input to generator 96, or the internal circuits of the generator designed to produce the required delay.

If desired, the single channel arrangements described in connection with Figs. 12–14 can be employed. In this case the arrangement of Fig. 22 may be modified by eliminating mixer 12′ and generator 14′. Synchronizing gate generator 97 will then perform its functions at the fundamental sweep repetition frequency.

Figure 23:
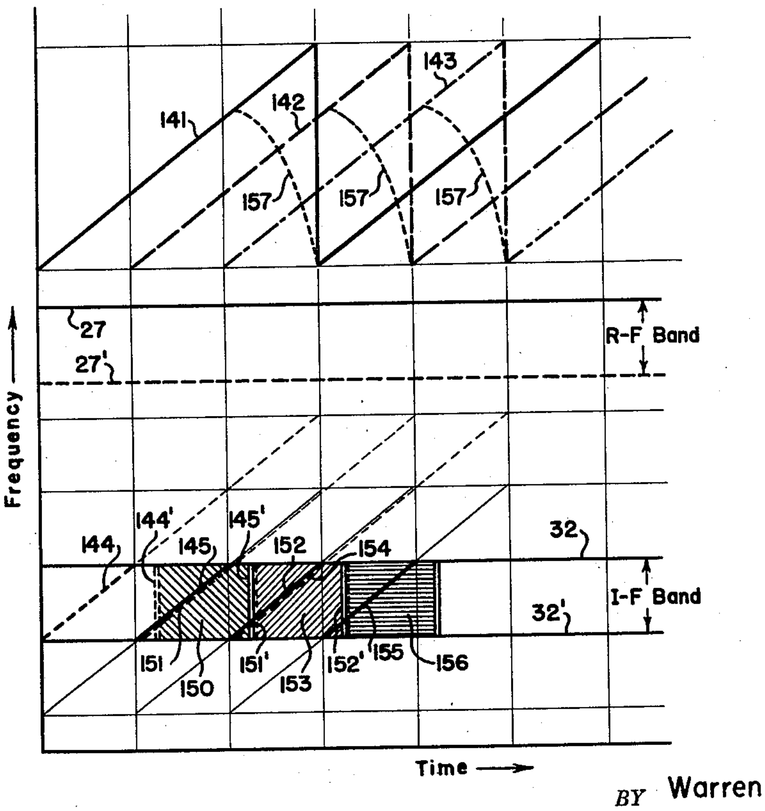
Fig. 23 is a graph illustrating the use of triple-interlaced sweep frequencies.

In the foregoing embodiments, two signal channels and double-interlaced frequency sweeps have been described. If desired, a greater number of channels and interlaced frequency sweeps may be employed. Fig. 23 shows the manner in which triple-interlaced frequency sweeps may be employed, it being assumed that three channels are used.

In Fig. 23, three local oscillator frequency sweeps 141, 142 and 143 are shown which are substantially identical but displaced in time to form a triple-interlaced pattern. The R.-F. band is indicated by lines 27, 27′, as before. The I.-F. band is indicated by lines 32, 32′ and is shown equal in width to the R.-F. band to be covered, as before.

Instead of employing a sweep frequency range equal to approximately twice the I.-F. bandwidth, as is preferred in double-interlacing, with triple-interlacing it is preferred to employ a sweep range approximately three times the I.-F. bandwidth. This is the condition shown in Fig. 23. During the first one-third of the sweep 141, incoming signal 27′ will produce a corresponding beat frequency sweep 144 within the I.-F. band. This portion is shown in heavy dotted lines and the remaining portion of the sweep outside the I.-F. band is lighter. A corresponding pulse 144′ will be produced in the dispersive network in the first channel. During the second one-third of sweep 141, incoming signal 27 will produce a beat frequency sweep 145 within the I.-F. band, and a corresponding pulse 145′ will be produced by the dispersive network. All other signals within the R.-F. band will produce beat frequency sweeps lying somewhere between 144 and 145, and corresponding pulses will be produced by the dispersive network in the cross-hatched area 150.

During the first one-third of the second sweep 142, incoming signal 27′ will produce a beat frequency sweep 151 within the I.-F. band. During the second one-third of sweep 142, signal 27 will produce a beat frequency sweep 152 within the I.-F. band. Corresponding pulses 151′ and 152′ will be produced by the dispersive network in the second channel. All other signals within the R.-F. band will produce pulses from the dispersive network in the second channel lying within the cross-hatched area 153.

Similarly, the third sweep 143 will produce beat frequency sweeps 154, 155 within the I.-F. band corresponding to signals 27′ and 27. Hence pulses corresponding to all signals within the R.-F. band will be produced by the dispersive network in the third channel during the cross-hatched area 156.

Accordingly, any signal within the R.-F. band occurring at any time will produce a response in one of the three channels, so that the receiver is wide open to the reception of signals at all times. However, resolution between the signals will be obtained, as described before.

If the local oscillator sweep frequencies 141–143 are increased in amplitude, so that they exceed three times the I.-F. bandwidth, time gaps may occur in the reception of a signal of given frequency, but a somewhat wider R.-F. band may be covered. On the other hand, if the sweep frequency ranges are reduced, there will be an overlap of areas 150, 153, 156 but interference in the output of the receiver can be avoided by switching the channels alternately to the output circuit, or by limiting the bandwidth at the input, as described hereinbefore.

It will be noted from the above explanation of Fig. 23 that only two-thirds of the periods of sweep frequencies 141–143 are required to obtain proper operation. Thus, it is not essential that the sweep return rapidly from final to initial frequencies, but a more gradual retrace is possible, as indicated by dotted lines 157, without sacrificing R.-F. acceptance bandwidth. This may be helpful in the design of the sweep frequency oscillator circuits, particularly when sweeps of high recurrence frequency are employed. To avoid interference due to extraneous beat frequencies being developed during the retraces 157, blanking during retrace intervals may be employed, as described hereinbefore.

The use of triple-interlacing, or a greater number of interlaces, in the various embodiments described will be clear from the above discussion of Fig. 23.

In the foregoing description continuous wave (C.W.) signals have usually been assumed for convenience of explanation. However, it will be understood that the various embodiments will respond to pulse transmissions also. Although many of the embodiments are particularly adapted for the reception of radio frequency signals, the invention can be employed in many other environments. In general, the incoming signals can lie anywhere in the frequency spectrum, and the beat frequency sweeps can lie above or below the incoming frequencies according to the particular application. For example, arrangements such as shown in Figs. 7, 11, 12 and 15 may be used in video frequency applications as well as R.-F. frequency applications.

The term "video frequency," as used herein, follows usage fairly common at the present time in that it may represent any desired type of information, and is not necessarily confined to representing visual information as in television.

The component circuits are shown as blocks since they are individually well known in the art and many different types are available. The individual circuits can be selected as meets the requirements of a given application.

A number of different embodiments have been described to illustrate the invention, but it will be understood that many additional modifications can be made within the spirit and scope of the invention, and that individual features or combinations of features can be employed as meets the requirements of a particular application.

I claim:

1. Signal translation apparatus which comprises an input circuit for receiving signals of substantially different frequencies, means for converting input signals of different frequencies into respective interlaced sets of frequency variations spaced in time, and means for converting said frequency variations into corresponding output signals of substantially shorter time durations respectively, the output signals corresponding to each input signal frequency recurring at the interlaced frequency of the corresponding frequency variations.

2. Signal translation apparatus which comprises an input circuit for receiving signals of substantially different frequencies, means for converting input signals of different frequencies into respective sets of interlaced frequency variations with said sets spaced in time in accordance with the input signal frequencies, the frequency of each of said frequency variations varying in accordance with the time occurrence of successive portions of the respective input signal during the duration of the variation, and means for converting said frequency variations into corresponding output signals in which the frequency components of each variation occur in a substantially shorter time, the output signals corresponding to each input signal frequency recurring at the interlaced frequency of the corresponding frequency variations.

3. Signal translation apparatus which comprises an input circuit for receiving signals of substantially different frequencies, means for converting input signals of different frequencies into respective sets of interlaced frequency sweeps with said sets spaced in time in accordance with the input signal frequencies, the effective portions of successive interlaced sweeps in each of said sets having substantially no time gap therebetween, the frequency of each sweep varying in accordance with the time occurrence of successive portions of the respective input signal in the respective sweep interval, and means for converting said frequency sweeps into corresponding output signals in which the frequency components of each sweep occur in a substantially shorter time, the output signals corresponding to each input signal frequency recurring at the interlaced frequency of the corresponding sweeps.

4. Signal translation apparatus which comprises an input circuit for receiving signals of substantially different frequencies, means for converting input signals of different frequencies into respective sets of interlaced frequency sweeps with said sets spaced in time in accordance with the input signal frequencies, the effective portions of successive interlaced sweeps in each of said sets having substantially no time gap therebetween, the frequency of each sweep varying in accordance with the time occurrence of successive portions of the respective input signal in the respective sweep interval, means for converting said frequency sweeps into corresponding output signals in which the frequency components of each sweep occur in a substantially shorter time, the output signals corresponding to each input signal frequency recurring at the interlaced frequency of the corresponding sweeps, and means for confining the effective production of output signals corresponding to input signals of different frequencies to substantially non-overlapping time intervals recurring at the interlaced sweep repetition frequency.

5. Signal translation apparatus which comprises an input circuit for receiving signals of substantially different frequencies, a plurality of channels connected to receive signals from said input circuit, means in each of said channels for repeatedly converting input signals of different frequencies into corresponding frequency sweeps spaced in time, the frequency sweeps in said channels corresponding to an input signal of given frequency being interlaced in time, means in each of said channels for converting frequency sweeps therein into corresponding pulses in which the frequency components of the respective sweeps occur in a substantially shorter time, and means for rendering the outputs of said last-mentioned means effective alternately at the interlaced sweep repetition frequency.

6. Signal translation apparatus which comprises an input circuit for receiving signals of substantially different frequencies, a plurality of channels connected to receive signals from said input circuit, converting means in each of said channels for repeatedly converting input signals of different frequencies into corresponding frequency sweeps spaced in time, the frequency sweeps in said channels corresponding to an input signal of given frequency being interlaced in time, means in each of said channels for converting frequency sweeps therein into corresponding pulses in which the frequency components of the respective sweeps occur in a substantially shorter time, and filter means in the path of input signals to said converting means having a bandwidth not substantially greater than the width of the frequency band traversed by a frequency sweep in an interlaced sweep period.

7. Signal translation apparatus which comprises a plurality of heterodyne mixers, means for supplying input signals to said mixers, means for supplying interlaced frequency sweeps to said mixers respectively, whereby interlaced beat frequency sweeps corresponding to respective input signals may be obtained, and dispersive network means supplied with said beat frequency sweeps and adapted to convert sweeps corresponding to input signals of different frequencies into corresponding pulses occurring successively in time, the pulses corresponding to an input signal of given frequency recurring at the interlaced sweep repetition frequency.

8. Signal translation apparatus which comprises a plurality of heterodyne mixers, means for supplying input signals to said mixers, means for supplying interlaced frequency sweeps to said mixers respectively, whereby interlaced beat frequency sweeps corresponding to respective input signals are produced at the outputs of said mixers, dispersive network means, and circuit connections supplying said beat frequency sweeps to said dispersive network means to convert sweeps corresponding to input signals of different frequencies into corresponding pulses occurring successively in time, the bandwidth of said circuit connections and dispersive network means being at least substantially the width of the frequency band traversed by a said frequency sweep in an interlaced sweep period.

9. Signal translation apparatus which comprises a plurality of channels each including a heterodyne mixer, means for supplying input signals to said mixers, means for supplying interlaced frequency sweeps to said mixers respectively, whereby interlaced beat frequency sweeps corresponding to respective input signals are produced at the outputs of said mixers, dispersive network means, circuit connections supplying said beat frequency sweeps to said dispersive network means to convert sweeps corresponding to input signals of different frequencies into corresponding pulses occurring successively in time, the bandwidth of said circuit connections and dispersive network means being at least substantially the width of the frequency band traversed by a said frequency sweep in an interlaced sweep period, and means for confining the effective operation of said channels to an input signal band not substantially wider than said frequency band.

10. Signal translation apparatus which comprises a plurality of channels each including a heterodyne mixer, means for supplying input signals to said mixers, means for supplying interlaced frequency sweeps to said mixers respectively, whereby interlaced beat frequency sweeps corresponding to respective input signals are produced at the outputs of said mixers, means connecting a dispersive network with the output of the mixer in each channel, said dispersive network having a delay dispersion substantially matched to the sweep rate of said beat frequency sweeps to convert sweeps corresponding to input signals of different frequencies into corresponding pulses occurring successively in time, the bandwidth of said dispersive network and connecting means being at least substantially the width of the frequency band traversed by a said frequency sweep in an interlaced sweep period, and means for confining the effective production of said pulses in said channels to respective substantially non-overlapping time intervals alternating at the interlaced sweep repetition frequency.

11. Signal translation apparatus which comprises a plurality of channels each including a heterodyne mixer and having a common output circuit, means for supplying input signals simultaneously to said mixers, means for supplying interlaced frequency sweeps to said mixers respectively, whereby interlaced beat frequency sweeps corresponding to respective input signal frequencies may be obtained, dispersive network means supplied with said beat frequency sweeps and adapted to convert sweeps corresponding to input signals of different frequencies into corresponding pulses occurring successively in time, and means for confining the effective transmission of signals through said plurality of channels to said common output circuit to respective substantially non-overlapping time intervals alternating at the interlaced sweep repetition frequency.

12. Signal translation apparatus which comprises a plurality of channels each including a heterodyne mixer and having a common output circuit, means for supplying input signals simultaneously to said mixers, a plurality of sweep frequency generators connected to supply interlaced frequency sweeps of substantially the same sweep range and sweep repetition period to said mixers respectively, whereby interlaced beat frequency sweeps corresponding to respective input signals are produced at the outputs of said mixers, an intermediate-frequency amplifier and dispersive network connected in cascade with the output of the mixer in each channel, said dispersive network having a delay dispersion substantially matched to the sweep rate of said beat frequency sweeps to convert sweeps corresponding to input signals of different frequencies into corresponding pulses occurring successively in time, the bandwidth of said amplifier and dispersive network being at least substantially the width of the frequency band traversed by a said frequency sweep in an interlaced sweep period, and means for confining the effective transmission of signals through said plurality of channels to said common output circuit to respective substantially non-overlapping time intervals alternating at the interlaced sweep repetition frequency.

13. Signal translation apparatus which comprises a plurality of channels each including a heterodyne mixer and a dispersive network connected to receive the output thereof, means for supplying input signals simultaneously to said mixers, means for supplying interlaced frequency sweeps to said mixers respectively, whereby interlaced beat frequency sweeps corresponding to respective input signals are produced at the outputs of said mixers, said dispersive networks having a delay dispersion substantially matched to the sweep rate of said beat frequency sweeps to convert sweeps corresponding to input signals of different frequencies into corresponding pulses occurring successively in time, and means for rendering the outputs of said dispersive networks effective alternately at the interlaced sweep repetition frequency.

14. Signal translation apparatus which comprises a plurality of channels each including a heterodyne mixer and a dispersive network and means connecting the dispersive network with the output of the mixer, means for supplying input signals simultaneously to said mixers, means for supplying interlaced frequency sweeps to said mixers respectively, whereby interlaced beat frequency sweeps corresponding to respective input signals are produced at the outputs of said mixers, said dispersive networks having a delay dispersion substantially matched to the sweep rate of said beat frequency sweeps to convert sweeps corresponding to input signals of different frequencies into corresponding pulses occurring successively in time, the bandwidths of said dispersive networks and connecting means being at least substantially the width of the frequency band traversed by a said frequency sweep in an interlaced sweep period, and switching means for rendering the outputs of said dispersive networks effective alternately at the interlaced sweep repetition frequency.

15. Signal translation apparatus which comprises a plurality of channels each including a heterodyne mixer, means for supplying input signals simultaneously to said mixers, means for supplying interlaced frequency sweeps to said mixers respectively, whereby interlaced beat frequency sweeps corresponding to respective input signals are produced at the outputs of said mixers, a common output circuit for said channels, a dispersive network connected in cascade between the output of the mixer in each channel and said common output circuit, said dispersive network being adapted to convert beat frequency sweeps corresponding to input signals of different frequencies into corresponding pulses occurring successively in time, and filter means in the path of input signals to said mixers having a bandwidth not substantially greater than the width of the frequency band traversed by a said frequency sweep in an interlaced sweep period.

16. Signal translation apparatus which comprises a plurality of channels each including a heterodyne mixer, means for supplying input signals simultaneously to said mixers, means for supplying interlaced frequency sweeps to said mixers respectively, whereby interlaced beat frequency sweeps corresponding to respective input signals are produced at the outputs of said mixers, a common output circuit for said channels, circuit means connecting a dispersive network in cascade between the output of the mixer in each channel and said common output circuit, said dispersive network having a delay dispersion, substantially matched to the sweep rate of said beat frequency sweeps to convert sweeps corresponding to input signals of different frequencies into corresponding pulses occurring successively in time, the bandwidth of said circuit means and dispersive network being at least substantially the width of the frequency band traversed by a said frequency sweep in an interlaced sweep period, and filter means in the path of input signals to said mixers having a bandwidth not substantially greater than the width of said frequency band.

17. A radio monitoring receiver which comprises a radio frequency input circuit for receiving signals of substantially different frequencies, a plurality of channels each including a heterodyne mixer, means for supplying input signals from said input circuit to said mixers, means for supplying interlaced frequency sweeps to said mixers respectively, whereby interlaced beat frequency sweeps corresponding to respective input signals are produced in the outputs of said mixers, a dispersive network connected in cascade with the output of the mixer in each channel and adapted to convert beat frequency sweeps corresponding to input signals of different frequencies into corresponding pulses occurring successively in time and a detector connected in cascade with the dispersive network in each channel during at least respective periods alternating at the interlaced sweep repetition frequency, whereby video pulses are produced successively corresponding to input signals of different frequencies with pulses corresponding to a given input signal recurring at the interlaced sweep repetition frequency.

18. A radio monitoring receiver which comprises a radio frequency input circuit for receiving signals of substantially different frequencies, a plurality of channels each including a heterodyne mixer and having a common output circuit, means for supplying input signals from said input circuit to said mixers, means for supplying interlaced frequency sweeps to said mixers respectively, whereby interlaced beat frequency sweeps corresponding to respective input signals are produced in the outputs of said mixers, circuit means connecting a dispersive network in cascade with the output of the mixer in each channel to convert beat frequency sweeps corresponding to input signals of different frequencies into corresponding pulses occurring successively in time, the bandwidth of said circuit means and dispersive network being at least substantially the width of the frequency band traversed by a said frequency sweep in an interlaced sweep period, and a detector connected in cascade with the dispersive network in each channel during at least respective periods alternating at the interlaced sweep repetition frequency, whereby video pulses are produced successively in said common output circuit corresponding to input signals of different frequencies with pulses corresponding to a given input signal recurring at the interlaced sweep repetition frequency.

19. A radio monitoring receiver which comprises a radio frequency input circuit for receiving signals of substantially different frequencies, a plurality of channels each including a heterodyne mixer and having a common output circuit, means for supplying input signals from said input circuit to said mixers, means for supplying interlaced frequency sweeps to said mixers respectively, whereby interlaced beat frequency sweeps corresponding to respective input signals are produced in the outputs of said mixers, circuit means connecting a dispersive network in cascade with the output of the mixer in each channel, said dispersive network having a delay dispersion substantially matched to the sweep rate of said beat frequency sweeps to convert sweeps corresponding to input signals of different frequencies into corresponding pulses occurring successively in time, the bandwidth of said circuit means and dispersive network being at least substantially the width of the frequency band traversed by a said frequency sweep in an interlaced sweep period, a detector connected in cascade with the dispersive network in each channel during at least respective periods alternating at the interlaced sweep repetition frequency to convert said pulses into corresponding video pulses, and means for confining the effective transmission of signals through said plurality of channels to said common output circuit to respective substantially non-overlapping time intervals alternating at the interlaced sweep repetition frequency, whereby video pulses are produced successively in said common output circuit corresponding to input signals of different frequencies with pulses corresponding to a given input signal recurring at the interlaced sweep repetition frequency.

20. A radio monitoring receiver which comprises a radio frequency input circuit for receiving signals of substantially different frequencies, a plurality of channels each including a heterodyne mixer, means for supplying input signals from said input circuit to said mixers, a plurality of sweep frequency generators connected to supply interlaced frequency sweeps of substantially the same sweep range and sweep repetition period to said mixers respectively, whereby interlaced beat frequency sweeps corresponding to respective input signals are produced at the outputs of said mixers, a common output circuit for said channels, an intermediate-frequency amplifier and a dispersive network connected in cascade between the output of the mixer in each channel and said common output circuit, said dispersive network having a delay dispersion substantially matched to the sweep rate of said beat frequency sweeps to convert sweeps corresponding to input signals of different frequencies into corresponding pulses occurring successively in time, the bandwidth of said amplifier and dispersive network being at least substantially the width of the frequency band traversed by a said frequency sweep in an interlaced sweep period, a detector connected in cascade with the dispersive network in each channel during at least respective periods alternating at the interlaced sweep repetition frequency to convert said pulses into corresponding video pulses, and means for confining the effective transmission of signals through said plurality of channels to said common output circuit to respective substantially non-overlapping time intervals alternating at the interlaced sweep repetition frequency, whereby video pulses are produced successively in said common output circuit corresponding to input signals of different frequencies with pulses corresponding to a given input signal recurring at the interlaced sweep repetition frequency.

21. A radio monitoring receiver which comprises a radio frequency input circuit for receiving signals of substantially different frequencies, a plurality of channels each including a heterodyne mixer and a dispersive network connected to receive the output thereof, means for supplying input signals from said input circuit to said mixers, means for supplying interlaced frequency sweeps to said mixers respectively, whereby interlaced beat frequency sweeps corresponding to respective input signals are produced in the outputs of said mixers, said dispersive networks having a delay dispersion substantially matched to the sweep rate of said beat frequency sweeps to convert sweeps corresponding to input signals of different frequencies into corresponding pulses occurring successively in time, a common output circuit for said channels, a detector connected in cascade between the dispersive network in each channel and said common output circuit during at least respective periods alternating at the interlaced sweep repetition frequency, and switching means between said dispersive networks and said common output circuit for rendering said channels effective alternately at the interlaced sweep repetition frequency.

22. A radio monitoring receiver which comprises a radio frequency input circuit for receiving signals of substantially different frequencies, a plurality of channels each including a heterodyne mixer and an intermediate-frequency amplifier and dispersive network connected in cascade with the mixer output, means for supplying input signals from said input circuit to said mixers, a plurality of sweep frequency generators connected to supply interlaced frequency sweeps of substantially the same sweep range and sweep repetition period to said mixers respectively, whereby interlaced beat frequency sweeps corresponding to respective input signals are produced at the outputs of said mixers, said dispersive networks having a delay dispersion substantially matched to the sweep rate of said beat frequency sweeps to convert sweeps corresponding to input signals of different frequencies into corresponding pulses occurring successively in time, the bandwidth of said amplifiers and dispersive networks being at least substantially the width of the frequency band traversed by a said frequency sweep in an interlaced sweep period, a common output circuit for said channels, switching means between said dispersive networks and said common output circuit for rendering said channels effective only during respective periods alternating at the interlaced sweep repetition frequency, and a detector connected in cascade between the dispersive network in each channel and said common output circuit during at least said respective periods.

23. A radio monitoring receiver which comprises a radio frequency input circuit for receiving signals of substantially different frequencies, a plurality of channels each including a heterodyne mixer, means for supplying input signals from said input circuit to said mixers, means for supplying interlaced frequency sweeps to said mixers respectively, whereby interlaced beat frequency sweeps corresponding to respective input signals are produced in the outputs of said mixers, a common output circuit for said channels, a dispersive network and a detector connected in cascade between the output of the mixer in each channel and said common output circuit, said dispersive network being adapted to convert beat frequency sweeps corresponding to input signals of different frequencies into corresponding pulses occurring successively in time, and filter means in the path of input signals to said mixers having a bandwidth not substantially greater than the width of the frequency band traversed by a said frequency sweep in an interlaced sweep period.

24. A radio monitoring receiver which comprises a radio frequency input circuit for receiving signals of substantially different frequencies, a plurality of channels each including a heterodyne mixer, means for supplying input signals from said input circuit to said mixers, a plurality of sweep frequency generators connected to supply interlaced frequency sweeps of substantially the same sweep range and sweep repetition period to said mixers respectively, whereby interlaced beat frequency sweeps corresponding to respective input signals are produced in the outputs of said mixers, a common output circuit for said channels, an intermediate-frequency amplifier, a dispersive network and a detector connected in cascade between the output of the mixer in each channel and said common output circuit, said dispersive network having a delay dispersion substantially matched to the sweep rate of said beat frequency sweeps to convert sweeps corresponding to input signals of different frequencies into corresponding pulses occurring successively in time, the bandwidth of said amplifier and dispersive network being at least substantially the width of the frequency band traversed by a said frequency sweep in an interlaced sweep period, and filter means in the path of input signals to said mixers having a bandwidth not substantially greater than the width of said frequency band.

25. Signal translation apparatus which comprises means for converting input signals of different frequencies into corresponding signal pulses spaced in time in accordance with the respective input frequencies, signal transmission means supplied with said signal pulses, and means connected to receive signals from said transmission means for converting signal pulses therefrom into corresponding signals separated in frequency in accordance with the time occurrence of said pulses.

26. Signal translation apparatus which comprises means for repeatedly converting input signals of different frequencies into corresponding frequency variations in which respective portions of similar frequency are spaced in time, the frequency variations corresponding to each input signal recurring successively and the frequency of said variations varying in accordance with the time occurrence of successive portions of the signal in respective time intervals, means for converting said frequency variations into respective signal pulses in which the frequency components of each variation occur in a substantially shorter time, signal transmission means supplied with said signal pulses, means connected to receive signals from said transmission means for converting signal pulses therefrom into frequency variations of substantially longer duration respectively, and means for converting the last-mentioned frequency variations into corresponding signals of relatively constant frequency respectively.

27. Signal translation apparatus which comprises means for converting input signals of different frequencies into corresponding signal pulses spaced in time in accordance with the respective input frequencies, amplitude control means for altering the relative amplitudes of said signal pulses, and means connected to receive signals from said amplitude control means for converting signal pulses therefrom into corresponding signals separated in frequency in accordance with the time occurrence of said pulses.

28. Signal translation apparatus which comprises means for repeatedly converting input signals of different frequencies into corresponding frequency sweeps in which respective portions of similar frequency are spaced in time, dispersive means for converting said sweeps into corresponding pulses occurring successively in time, signal transmission means supplied with said pulses, inverse dispersive means for converting pulses from said transmission means into corresponding frequency sweeps, and means for converting the last-mentioned frequency sweeps into corresponding signals of relatively constant frequency respectively.

29. Signal translation apparatus which comprises means for repeatedly converting input signals of different frequencies into corresponding frequency sweeps in which respective portions of similar frequency are spaced in time, dispersive means for converting said sweeps into corresponding pulses occurring successively in time, amplitude control means for altering the relative amplitudes of said pulses, and inverse dipsersive means for converting pulses from said amplitude control means into corresponding frequency sweeps.

30. Signal translation apparatus which comprises means for repeatedly converting input signals of different frequencies into corresponding frequency sweeps in which respective portions of similar frequency are spaced in time, dispersive means for converting said sweeps into corresponding pulses occurring successively in time, gate means supplied from said dispersive means for passing only pulses corresponding to a narrow band of input signal frequencies, means for converting pulses from said gate means into corresponding frequency sweeps, and means for converting the last-mentioned frequency sweeps into corresponding output signals lying within a predetermined narrow band of output signal frequencies.

31. A signal translation system which comprises means for repeatedly converting input signals of different frequencies into corresponding frequency sweeps in which respective portions of similar frequency are spaced in time, dispersive means for converting said sweeps into corresponding pulses occurring successively in time, gate means supplied from said dispersive means, means for producing repetitive gate pulses of adjustable time occurrence, means for supplying said gate pulses to said gate means to pass only pulses corresponding to a narrow band of input signal frequencies, said narrow band being selectable by adjusting the time occurrence of said gate pulses, means for converting pulses from said gate means into corresponding frequency sweeps, and means for converting the last-mentioned frequency sweeps into corresponding output signals lying within a substantially fixed narrow band of output signal frequencies.

32. Signal translation apparatus which comprises heterodyne mixer means for receiving input signals, means for supplying repetitive frequency sweeps to said mixer means, whereby beat frequency sweeps to said mixer means, whereby beat frequency sweeps corresponding to input signals may be obtained, dispersive network means for converting beat frequency sweeps corresponding to input signals of different frequencies into corresponding pulses occurring successively in time, amplitude control means for controlling the relative amplitude of said pulses, and inverse dispersive network means for converting pulses from said amplitude control means into corresponding frequency sweeps.

33. Signal translation apparatus which comprises heterodyne mixer means for receiving input signals, means for supplying repetitive frequency sweeps to said mixer means, whereby beat frequency sweeps corresponding to input signals may be obtained, dispersive network means for converting beat frequency sweeps corresponding to input signals of different frequencies into corresponding pulses occurring successively in time, amplitude control means for controlling the relative amplitude of said pulses, inverse dispersive network means for converting pulses from said amplitude control means into corresponding frequency sweeps, and heterodyne mixer means supplied with the last-mentioned frequency sweeps and with frequency sweeps of substantially the same sweep rate to produce corresponding beat frequencies.

34. Signal translation apparatus which comprises heterodyne mixer means for receiving input signals, means for supplying repetitive frequency sweeps to said mixer means, whereby beat frequency sweeps corresponding to input signals may be obtained, dispersive network means for converting beat frequency sweeps corresponding to input signals of different frequencies into corresponding pulses occurring successively in time, limiter means for limiting the amplitude of said pulses, inverse dispersive network means for converting pulses from said limiter means into corresponding frequency sweeps, said dispersive and inverse dispersive network means having complementary delay dispersions substantially matched to the sweep rate of said frequency sweeps, second heterodyne mixer means supplied with the frequency sweeps from said inverse dispersive network means, and means for supplying to said second mixer means repetitive frequency sweeps similar to the first-mentioned sweeps and of substantially fixed phase with respect thereto, whereby beat frequencies may be produced similar to input signal frequencies but frequency-by-frequency limited.

35. Signal translation apparatus which comprises a plurality of heterodyne mixers, means for supplying input signals to said mixers, means for supplying interlaced frequency sweeps to said mixers respectively, whereby interlaced beat frequency sweeps corresponding to respective input signals may be produced, dispersive means supplied with said beat frequency sweeps and adapted to convert sweeps corresponding to input signals of different frequencies into corresponding pulses occurring successively in time, amplitude control means for altering the relative amplitudes of said pulses, and inverse dispersive means supplied from said amplitude control means and adapted to convert pulses supplied thereto into corresponding frequency sweeps.

36. Signal translation apparatus which comprises a plurality of heterodyne mixers, means for supplying input signals to said mixers, means for supplying interlaced frequency sweeps to said mixers respectively, whereby interlaced beat frequency sweeps corresponding to respective input signals may be produced, dispersive network means supplied with said beat frequency sweeps and adapted to convert sweeps corresponding to input signals of different frequencies into corresponding pulses occurring successively in time, amplitude control means for altering the relative amplitudes of said pulses, inverse dispersive network means supplied from said amplitude control means and adapted to convert pulses supplied thereto into corresponding frequency sweeps, and heterodyne mixer means supplied with the last-mentioned frequency sweeps and with interlaced frequency sweeps of substantially the same sweep rate to produce corresponding beat frequencies.

37. Signal translation apparatus which comprises a plurality of channels each including a first heterodyne mixer, means for supplying input signals to said mixers, means for supplying interlaced frequency sweeps to said mixers respectively, whereby interlaced beat frequency sweeps corresponding to respective input signals are produced at the outputs of said mixers, a common output circuit for said channels, a dispersive network, an amplitude control device, an inverse dispersive network and second heterodyne mixer means connected in cascade between the output of the first mixer in each channel and said common output circuit during at least respective periods alternating at the interlaced sweep repetition frequency, said dispersive network being adapted to convert beat frequency sweeps corresponding to input signals of different frequencies into corresponding pulses occurring successively in time, said amplitude control device being adapted to alter the relative amplitudes of said pulses, said inverse dispersive network being adapted to convert pulses from said amplitude control device into corresponding frequency sweeps supplied to said second mixer means, and means for supplying interlaced frequency sweeps to said second mixer means of substantially the same sweep rate as the sweeps from said inverse dispersive network, whereby beat frequencies corresponding to the frequency sweeps from said inverse dispersive network may be produced in said common output circuit.

38. Signal translation apparatus which comprises a plurality of channels each including first and second heterodyne mixers, means for supplying input signals to the first mixers in said channels, means for supplying interlaced frequency sweeps to said first mixers respectively, a dispersive network, an amplitude control device and an inverse dispersive network connected in cascade between the first and second mixers in each channel, and means for supplying interlaced frequency sweeps to said second mixers respectively.

39. Signal translation apparatus which comprises a plurality of channels each including first and second heterodyne mixers and having a common output circuit, means for supplying input signals to the first mixers in said channels, means for supplying interlaced frequency sweeps to said first mixers respectively, a dispersive network, an amplitude control device and an inverse dispersive network connected in cascade between the first and second mixers in each channel, and means for supplying interlaced frequency sweeps to said second mixers respectively to produce beat frequencies with frequency sweeps thereto through said channels, whereby frequencies may be obtained in said common output circuit corresponding to input signal frequencies but with altered relative amplitude.

40. Signal translation apparatus which comprises a plurality of channels each including first and second heterodyne mixers and having a common output circuit, means for supplying input signals to the first mixers in said channels, means for supplying interlaced frequency sweeps to said first mixers respectively, a dispersive network, an amplitude control device and an inverse dispersive network connected in cascade between the first and second mixers in each channel, the bandwidths of said channels being at least substantially the width of the frequency band traversed by a said frequency sweep in an interlaced sweep period, means for supplying interlaced frequency sweeps to said second mixers respectively to produce beat frequencies with frequency sweeps thereto through said channels, and means for confining the effective operation of said channels to an input signal band not substantially wider than said frequency band, whereby frequencies may be obtained in said common output circuit corresponding to input signal frequencies but with altered relative amplitude.

41. Signal translation apparatus which comprises a plurality of channels each including first and second heterodyne mixers and having a common output circuit, means for supplying input signals simultaneously to the first mixers in said channels, means for supplying first interlaced frequency sweeps of substantially the same sweep rate and sweep repetition period to said first mixers respectively, a dispersive network, an amplitude control device and an inverse dispersive network connected in cascade between the first and second mixers in each channel, said dispersive and inverse dispersive networks having complementary delay dispersions substantially matched to said sweep rate, the bandwidths of said channels being at least substantially the width of the frequency band traversed by a said first frequency sweep in an interlaced sweep period, means for supplying to respective second mixers interlaced frequency sweeps having substantially the same sweep rate and sweep repetition period as said first sweeps, and means for confining the effective operation of said channels to a band of input signals not substantially wider than said frequency band, whereby frequencies may be obtained in said common output circuit corresponding to input signal frequencies but with altered relative amplitude.

42. Signal translation apparatus which comprises a plurality of channels each including first and second heterodyne mixers and a dispersive network in cascade therebetween, a common output circuit for said channels, means for supplying input signals simultaneously to the first mixers in said channels, means for supplying first interlaced frequency sweeps of substantially the same sweep rate and sweep repetition period to said first mixers respectively, an amplitude control device and an inverse dispersive network connected in cascade between the dispersive networks and second mixers in each channel, said dispersive and inverse dispersive networks having complementary delay dispersions substantially matched to said sweep rate, the bandwidths of said channels being at least substantially the width of the frequency band traversed by a said first frequency sweep in an interlaced sweep period, switching means between said dispersive and inverse dispersive networks for passing signals through said channels alternately at the interlaced sweep repetition frequency, and means for supplying to respective second mixers interlaced frequency sweeps having substantially the same sweep rate and sweep repetition period as said first sweeps, frequencies may be obtained in said common output circuit corresponding to input signal frequencies but with altered relative amplitude.

43. Signal translation apparatus which comprises a plurality of channels each including first and second heterodyne mixers and having a common output circuit, means for supplying input signals simultaneously to the first mixers in said channels, means for supplying first interlaced frequency sweeps of substantially the same sweep rate and sweep repetition period to said first mixers respectively, a dispersive network, an amplitude control device and an inverse dispersive network connected in cascade between the first and second mixers in each channel, said dispersive and inverse dispersive networks having complementary delay dispersions substantially matched to said sweep rate, the bandwidths of said channels being at least substantially the width of the frequency band traversed by a said first frequency sweep in an interlaced sweep period, filter means in the path of input signals to said first mixers having a bandwidth not substantially wider than the width of said frequency band, and means for supplying to respective second mixers interlaced frequency sweeps having substantially the same sweep rate and sweep repetition period as said first sweeps, whereby frequencies may be obtained in said common output circuit corresponding to input signal frequencies but with altered relative amplitude.

44. Signal translation apparatus which comprises a plurality of channels each including first and second heterodyne mixers and having a common output circuit, means for supplying input signals simultaneously to the first mixers in said channels, means for supplying first interlaced frequency sweeps of substantially the same sweep rate and sweep repetition period to said first mixers respectively, a dispersive network, an amplitude limiter and an inverse dispersive network connected in cascade between the first and second mixers in each channel, said dispersive and inverse dispersive networks having complementary delay dispersions substantially matched to said sweep rate, the bandwidths of said channels being at least substantially the width of the frequency band traversed by a said first frequency sweep in an interlaced sweep period, and means for supplying to respective second mixers interlaced frequency sweeps having substantially the same sweep rate and sweep repetition period as said first sweeps, whereby beat frequencies may be produced similar to input signal frequencies but frequency-by-frequency limited.

45. Signal translation apparatus which comprises a heterodyne mixer for receiving input signals, means for supplying repetitive frequency sweeps to said mixer, whereby beat frequency sweeps corresponding to input signals may be obtained, circuit means connecting a dispersive network with the output of said mixer for converting beat frequency sweeps corresponding to input signals of different frequencies into corresponding pulses occurring successively in time, amplitude control means for controlling the relative amplitude of said pulses, an inverse dispersive network for converting pulses from said amplitude control means into corresponding frequency sweeps, the bandwidths of said circuit means and dispersive and inverse dispersive networks being substantially greater than the frequency range of the first-mentioned sweeps, and a heterodyne mixer supplied with the last-mentioned frequency sweeps and with frequency sweeps of substantially the same sweep rate to produce corresponding beat frequencies.

46. Signal translation apparatus which comprises a first heterodyne mixer, a dispersive network, a gating device, an inverse dispersive network and a second heterodyne mixer connected in cascade in the order named, means for supplying input signals to said first mixer, means for supplying frequency sweeps of predetermined sweep rate and sweep repetition frequency to said first mixer, a gate pulse generator for producing gate pulses recurring at said sweep repetition frequency and of adjustable time occurrence in a sweep period, means supplying said gate pulses to said gating device to pass only pulses corresponding to a narrow band of input signal frequencies from said dispersive to said inverse dispersive networks, a sweep frequency generator connected to supply frequency sweeps of substantially said predetermined sweep rate to said second mixer, and means utilizing said gate pulses to control the initiation of sweeps in said sweep frequency generator, whereby signals lying within a substantially fixed narrow band may be obtained from said second mixer corresponding to a selected narrow band of input signal frequencies.

47. Signal translation apparatus which comprises a plurality of channels each including a first heterodyne mixer, means for supplying input signals to said first mixers, means for supplying interlaced frequency sweeps of substantially the same sweep rate and sweep repetition frequency to said first mixers respectively, a common output circuit for said channels, a dispersive network, a gating device, an inverse dispersive network and a second heterodyne mixer connected in cascade between the output of the first mixer in each channel and said common output circuit during at least respective periods alternating at the interlaced sweep repetition frequency, said dispersive and inverse dispersive networks having complementary delay dispersions substantially matched to said sweep rate, the bandwidths of said channels being at least substantially the width of the frequency band traversed by a said frequency sweep in an interlaced sweep period, a gate pulse generator for producing gate pulses recurring at the interlaced sweep repetition frequency and of adjustable time occurence in an interlaced sweep period, means supplying said gate pulses to the gating device in each channel at least during said respective periods to pass only pulses corresponding to a narrow band of input signal frequencies from said dispersive to said inverse dispersive networks, sweep frequency generator means connected to supply frequency sweeps having substantially said sweep rate to the second mixer in each channel during at least said respective periods, and means utilizing said gate pulses to control the initiation of sweeps in said sweep frequency generator means in substantially fixed time relationship with said gate pulses, whereby signals lying within a substantially fixed narrow band may be produced in said common output circuit corresponding to a selected narrow band of input signal frequencies.

48. Signal translation apparatus of controllable frequency pass band which comprises means for repeatedly converting input signals of different frequencies into corresponding frequency sweeps in which respective portions of similar frequency are spaced in time, dispersive means for converting said sweeps into corresponding pulses occurring successively in time, variable amplitude control means supplied from said dispersive means, means for supplying repetitive control waves to said amplitude control means to control the passage of pulses therethrough, inverse dispersive means for converting pulses from said amplitude control means into corresponding frequency sweeps, and means for converting the last-mentioned frequency sweeps into corresponding signals of relatively constant frequency respectively.

49. Signal translation apparatus of controllable frequency pass band which comprises means for repeatedly converting input signals of different frequencies into corresponding frequency sweeps in which respective portions of similar frequency are spaced in time, dispersive means for converting said sweeps into corresponding pulses occurring successively in time, variable amplitude control means supplied from said dispersive means, means for producing repetitive control waves, means for supplying said control waves to said amplitude control means to control the passage of pulses therethrough, inverse dispersive means for converting pulses from said amplitude control means into corresponding frequency sweeps, and means for converting the last-mentioned frequency sweeps into signals of frequencies substantially the same as the frequencies of the corresponding input signals, whereby output signals may be obtained corresponding to input signals but with altered relative amplitude.

50. Signal translation apparatus of controllable frequency pass band which comprises heterodyne mixer means for receiving input signals, means for supplying repetitive frequency sweeps to said mixer means, whereby beat frequency sweeps corresponding to input signals may be obtained, dispersive network means for converting beat frequency sweeps corresponding to input signals of different frequencies into corresponding pulses occurring successively in time, amplitude control means supplied from said dispersive network means, means for producing repetitive control waves synchronized with said frequency sweeps, means for supplying said control waves to said amplitude control means to control the passage of pulses therethrough, inverse dispersive network means for converting pulses from said amplitude control means into corresponding frequency sweeps, said dispersive and inverse dispersive network means having complementary delay dispersions substantially matched to the sweep rate of said frequency sweeps, and heterodyne mixer means supplied with the frequency sweeps from said inverse dispersive network means and with frequency sweeps of substantially the same sweep rate to produce corresponding beat frequencies.

51. Signal translation apparatus of controllable frequency pass band which comprises heterodyne mixer means for receiving input signals, means for supplying repetitive frequency sweeps to said mixer means, whereby beat frequency sweeps corresponding to input signals may be obtained, dispersive network means for converting beat frequency sweeps corresponding to input signals of different frequencies into corresponding pulses occurring successively in time, amplitude control means supplied from said dispersive network means, means for producing repetitive control waves synchronized with said frequency sweeps, means for supplying said control waves to said amplitude control means to control the passage of pulses therethrough, inverse dispersive network means for converting pulses from said amplitude control means into corresponding frequency sweeps, said dispersive and inverse dispersive network means having complementary delay dispersions substantially matched to the sweep rate of said frequency sweeps, second heterodyne mixer means supplied with the frequency sweeps from said inverse dispersive network means, and means for supplying to said second mixer means repetitive frequency sweeps similar to the first-mentioned sweeps and of substantially fixed phase with respect thereto, whereby beat frequencies may be produced corresponding to input signal frequencies but with altered relative amplitude.

52. Signal translation apparatus of controllable frequency pass band which comprises heterodyne mixer means for receiving input signals, means for supplying repetitive frequency sweeps to said mixer means, whereby beat frequency sweeps corresponding to input signals may be obtained, dispersive network means for converting beat frequency sweeps corresponding to input signals of different frequencies into corresponding pulses occurring successively in time, gate means supplied from said dispersive network means, means for producing repetitive gate pulses synchronized with said frequency sweeps but of adjustable phase with respect thereto, means for supplying said gate pulses to said gate means to pass only pulses corresponding to a narrow band of input signal frequencies, inverse dispersive network means for converting pulses from said gate means into corresponding frequency sweeps, said dispersive and inverse dispersive network means having complementary delay dispersions substantially matched to the sweep rate of said frequency sweeps, and second heterodyne mixer means supplied with the frequency sweeps from said inverse dispersive network means and with frequency sweeps of substantially the same sweep rate, the last-mentioned frequency sweeps having a substantially fixed phase with respect to said gate pulses, whereby frequencies lying within a substantially fixed narrow band may be obtained from said second mixer means corresponding to a selected narrow band of input signal frequencies.

53. Signal translation apparatus of controllable frequency pass band which comprises a plurality of heterodyne mixers, means for supplying input signals to said mixers, means for supplying interlaced frequency sweeps to said mixers respectively, whereby interlaced beat frequency sweeps corresponding to respective input signals may be produced, dispersive network means supplied with said beat frequency sweeps and adapted to convert sweeps corresponding to input signals of different frequencies into corresponding pulses occurring successively in time, amplitude control means supplied with said pulses, a control wave source synchronized with said interlaced frequency sweeps for producing repetitive control waves, means supplying said control waves to said amplitude control means, inverse dispersive network means supplied from said amplitude control means and adapted to convert pulses supplied thereto into corresponding frequency sweeps, and heterodyne mixer means supplied with the last-mentioned frequency sweeps and with interlaced frequency sweeps of substantially the same sweep rate to produce corresponding beat frequencies.

54. Signal translation apparatus of controllable frequency pass band which comprises a plurality of channels each including a first heterodyne mixer, means for supplying input signals to said mixers, means for supplying interlaced frequency sweeps to said mixers respectively, a common output circuit for said channels, a dispersive network, an amplitude control device, an inverse dispersive network and second heterodyne mixer means connected in cascade between the output of the first mixer in each channel and said common output circuit, a control wave source for producing repetitive control waves recurring at the interlaced sweep repetition frequency, means supplying said control waves to the control device in each channel at least during respective periods alternating at the interlaced sweep repetition frequency to alter the relative amplitudes of signals passing therethrough, and means for supplying interlaced frequency sweeps to said second mixer means to produce beat frequencies with sweeps supplied thereto from said inverse dispersive networks.

55. Signal translation apparatus of controllable frequency pass band which comprises a plurality of channels each including first and second heterodyne mixers, means for supplying input signals to the first mixers in said channels, means for supplying interlaced frequency sweeps to said first mixers respectively, a dispersive network, an amplitude control device and an inverse dispersive network connected in cascade between the first and second mixers in each channel during at least respective periods alternating at the interlaced sweep repetition frequency, a control wave source synchronized with said interlaced frequency sweeps for producing repetitive control waves, means supplying said control waves to said control device in each channel during at least said respective periods, and means for supplying interlaced frequency sweeps to said second mixers respectively.

56. Signal translation apparatus of controllable frequency pass band which comprises a plurality of channels each including first and second heterodyne mixers and having a common output circuit, means for supplying input signals simultaneously to the first mixers in said channels, means for supplying interlaced frequency sweeps of substantially the same sweep rate and sweep repetition frequency to said first mixers respectively, a dispersive network, an amplitude control device and an inverse dispersive network connected in cascade between the first and second mixers in each channel during at least respective periods alternating at the interlaced sweep repetition frequency, said dispersive and inverse dispersive networks having complementary delay dispersions substantially matched to said sweep rate, the bandwidths of said channels being at least substantially the width of the frequency band traversed by a said frequency sweep in an interlaced sweep period, a control wave source for producing repetitive control waves recurring at the interlaced sweep repetition frequency, means for supplying said control waves to said amplitude control device in each channel during at least said respective periods to alter the relative amplitude of pulses corresponding to input signals of different frequencies, and means for supplying interlaced frequency sweeps to said second mixers respectively to produce beat frequencies with frequency sweeps thereto through said channels, whereby frequencies may be obtained in said common output circuit corresponding to input signal frequencies but with altered relative amplitude.

57. Signal translation apparatus of controllable frequency pass band which comprises a plurality of channels each including first and second heterodyne mixers and having a common output circuit, means for supplying input signals simultaneously to the first mixers in said channels, means for supplying first interlaced frequency sweeps of substantially the same sweep rate and sweep repetition frequency to said first mixers respectively, a dispersive network, an amplitude control device and an inverse dispersive network connected in cascade between the first and second mixers in each channel during at least respective periods alternating at the interlaced sweep repetition frequency, said dispersive and inverse dispersive networks having complementary delay dispersions substantially matched to said sweep rate, the bandwidths of said channels being at least substantially the width of the frequency band traversed by a said frequency sweep in an interlaced sweep period, a control wave source for producing repetitive control waves recurring at the interlaced sweep repetition frequency, means for supplying said control waves to said amplitude control device in each channel during at least said respective periods to alter the relative amplitude of pulses corresponding to input signals of different frequencies, means for supplying to respective second mixers interlaced frequency sweeps having substantially the same sweep rate and sweep repetition frequency as said first sweeps and of substantially fixed delay relative thereto, said delay being substantially equal to the interval between the sweep frequencies at the output of the first mixer and the input of the second mixer in each of said channels corresponding to the same input signal frequency, and means for confining the effective operation of said channels to a band of input signals not substantially wider than said frequency band, whereby frequencies may be obtained in said common output circuit corresponding to input signal frequencies but with altered relative amplitude.

58. Signal translation apparatus of controllable frequency pass band which comprises a heterodyne mixer for receiving input signals, means for supplying repetitive frequency sweeps to said mixer, whereby beat frequency sweeps corresponding to input signals may be obtained, circuit means connecting a dispersive network with the output of said mixer for converting beat frequency sweeps corresponding to input signals of different frequencies into corresponding pulses occurring successively in time, an amplitude control device supplied from said dispersive network, means for producing repetitive control waves synchronized with said frequency sweeps, means for supplying said control waves to said amplitude control device to control the passage of pulses therethrough, an inverse dispersive network for converting pulses from said amplitude control device into corresponding frequency sweeps, the bandwidths of said circuit means and dispersive and inverse dispersive networks being substantially greater than the frequency range of the first-mentioned sweeps and the dispersive and inverse dispersive networks having complementary delay dispersions substantially matched to the sweep rate thereof, and a heterodyne mixer supplied with the last-mentioned frequency sweep and with frequency sweeps of substantially the same sweep rate to produce corresponding beat frequencies.

59. A radio monitoring receiver which comprises a radio frequency input circuit for receiving signals of substantially different frequencies, means for repeatedly converting signals from said input circuit of different frequencies into corresponding frequency sweeps in which respective portions of similar frequency are spaced in time, dispersive means for converting said sweeps into corresponding pulses occurring successively in time, detector means supplied from the output of said dispersive means for producing corresponding video pulses, amplitude control means supplied from the output of said dispersive means, means utilizing said video pulses to control the passage of pulses through said control means, inverse dispersive means for converting pulses from said control means into corresponding frequency sweeps, and means for converting the last-mentioned frequency sweeps into corresponding signals.

60. A radio monitoring receiver which comprises a radio frequency input circuit for receiving signals of substantially different frequencies, heterodyne mixer means connected to receive signals from said input circuit, means for supplying repetitive frequency sweeps to said mixer means, whereby beat frequency sweeps corresponding to input signals may be obtained, dispersive network means for converting beat frequency sweeps corresponding to input signals of different frequencies into corresponding pulses occurring successively in time, detector means supplied from the output of said dispersive network means for producing corresponding video pulses, amplitude control means supplied from the output of said dispersive network means, means utilizing said video pulses to control the passage of pulses through said control means, inverse dispersive network means for converting pulses from said control means into corresponding frequency sweeps, and heterodyne mixer means supplied with the frequency sweeps from said inverse dispersive network means and with frequency sweeps of substantially the same sweep rate to produce corresponding beat frequencies.

61. A radio monitoring receiver which comprises a radio frequency input circuit for receiving signals of substantially different frequencies, heterodyne mixer means connected to receive signals from said input circuit, means for supplying repetitive frequency sweeps to said mixer means, whereby beat frequency sweeps corresponding to input signals may be obtained, dispersive network means for converting beat frequency sweeps corresponding to input signals of different frequencies into corresponding signal pulses occurring successively in time, detector means supplied from the output of said dispersive network means for producing corresponding video pulses, a video integrator supplied from said detector means to integrate successive video pulses corresponding to the same input signal, amplitude control means supplied from the output of said dispersive network means, means supplying said integrated video pulses to said control means to alter the gain thereof for corresponding signal pulses relative to the gain for intervals therebetween, inverse dispersive network means for converting pulses from said control means into corresponding frequency sweeps, said dispersive and inverse dispersive network means having complementary delay dispersions substantially matched to the sweep rate of said frequency sweeps, second heterodyne mixer means supplied with the frequency sweeps from said inverse dispersive network means, and means for supplying to said second mixer means repetitive frequency sweeps similar to the first-mentioned sweeps and of substantially fixed phase with respect thereto, whereby output signal frequencies may be produced corresponding to input signal frequencies under the control of said video pulses.

62. A radio monitoring receiver which comprises a radio frequency input circuit for receiving signals of substantially different frequencies, a heterodyne mixer connected to said input circuit, means for supplying repetitive frequency sweeps to said mixer, whereby beat frequency sweeps corresponding to input signals may be obtained, circuit means connecting a dispersive network with the output of said mixer for converting beat frequency sweeps corresponding to input signals of different frequencies into corresponding signal pulses occurring successively in time, a detector connected to the output of said dispersive network for producing corresponding video pulses, a video integrator connected to said detector to integrate successive video pulses corresponding to the same input signal, an amplitude control device connected to the output of said dispersive network, means supplying said integrated video pulses to said control device to alter the gain thereof for corresponding signal pulses relative to the gain for intervals therebetween, an inverse dispersive network for converting pulses from said amplitude control device into corresponding frequency sweeps, the bandwidths of said circuit means and dispersive and inverse dispersive networks being substantially greater than the frequency range of the first-mentioned sweeps and the dispersive and inverse dispersive networks having complementary delay dispersions substantially matched to the sweep rate thereof, a second heterodyne mixer connected to the output of said inverse dispersive network, and means for supplying to said second mixer repetitive frequency sweeps similar to the first-mentioned sweeps and of substantially fixed phase with respect thereto, whereby output signal frequencies from said second mixer correspond to input signal frequencies under the control of said video pulses.

63. A radio monitoring receiver which comprises a radio frequency input circuit for receiving signals of substantially different frequencies, a plurality of channels each including first and second heterodyne mixers, means for supplying signals from said input circuit to said first mixers respectively, means for supplying interlaced frequency sweeps to said first mixers respectively, a dispersive network, an amplitude control device and an inverse dispersive network connected in cascade between the first and second mixers in each channel during at least respective periods alternating at the interlaced sweep repetition frequency, detector means supplied from the output of the dispersive network in each channel for producing video pulses from corresponding signal pulses, means utilizing said video pulses to control the passage of signal pulses through said control device in each channel, and means for supplying interlaced frequency sweeps to said second mixers respectively to produce beat frequencies with frequency sweeps thereto through said channels.

64. A radio monitoring receiver which comprises a radio frequency input circuit for receiving signals of substantially different frequencies, a plurality of channels each including first and second heterodyne mixers and having a common output circuit, means for supplying signals from said input circuit to said first mixers respectively, means for supplying interlaced frequency sweeps of substantially the same sweep rate and sweep repetition frequency to said first mixers respectively, a dispersive network, an amplitude control device and an inverse dispersive network connected in cascade between the first and second mixers in each channel during at least respective periods alternating at the interlaced sweep repetition frequency, said dispersive and inverse dispersive networks having complementary delay dispersions substantially matched to said sweep rate, the bandwidths of said channels being at least substantially the width of the frequency band traversed by a said frequency sweep in an interlaced sweep period, detector means supplied from the output of the dispersive network in each channel for producing video pulses from corresponding signal pulses, video integrator means for integrating successive video pulses corresponding to the same input signal, means supplying said integrated video pulses to the control device in each channel to alter the gain thereof for corresponding signal pulses relative to the gain for intervals therebetween, and means for supplying interlaced frequency sweeps to said second mixers respectively to produce beat frequencies with frequency sweeps thereto through said channels, whereby signals may be obtained in said common output circuit corresponding to input signals under the control of said video pulses.

65. A radio monitoring receiver which comprises a radio frequency input circuit for receiving signals of substantially different frequencies, a plurality of channels each including a first heterodyne mixer, means for supplying signals from said input circuit to said first mixers respectively, means for supplying interlaced frequency sweeps of substantially the same sweep rate and sweep repetition frequency to said first mixers respectively, a common output circuit for said channels, a dispersive network, a gating device, an inverse dispersive network and a second heterodyne mixer connected in cascade between the output of the first mixer in each channel and said common output circuit during at least respective periods alternating at the interlaced sweep repetition frequency, a detector supplied from the output of the dispersive network in each channel to produce video pulses corresponding to input signals of different frequencies, display means having at least one time base synchronized with said interlaced sweeps for displaying said video pulses, gate pulse generating means for producing gate pulses recurring at the interlaced sweep repetition frequency and of adjustable time occurrence in an interlaced sweep period, connections supplying said gate pulses to said display means for displaying the relative time occurrence of said gate and video pulses, means supplying said gate pulses to the gating device in each channel at least during said respective periods to pass selected signal pulses from said dispersive to said inverse dispersive networks, sweep frequency generating means connected to supply frequency sweeps having substantially said sweep rate to the second mixer in each channel, and means utilizing said gate pulses to control the initiation of sweeps in said sweep frequency generating means, whereby a selected displayed input signal may be gated to said output circuit and reproduced in a substantially fixed narrow frequency band.

66. A radio monitoring receiver which comprises a radio frequency input circuit for receiving signals of substantially different frequencies, a plurality of channels each including a first heterodyne mixer, means for supplying signals from said input circuit to said first mixers respectively, means for supplying interlaced frequency sweeps of substantially the same sweep rate and sweep repetition frequency to said first mixers respectively, a common output circuit for said channels, a dispersive network, a gating device, an inverse dispersive network and a second heterodyne mixer connected in cascade between the output of the first mixer in each channel and said common output circuit during at least respective periods alternating at the interlaced sweep repetition frequency, said dispersive and inverse dispersive networks having complementary delay dispersions substantially matched to said sweep rate, the bandwidths of said channels being at least substantially the width of the frequency band traversed by a said frequency sweep in an interlaced sweep period, a detector supplied from the output of the dispersive network in each channel to produce video pulses corresponding to input signals of different frequencies, display means having at least one time base synchronized with said interlaced sweeps for displaying said video pulses, a gate pulse generator for producing gate pulses recurring at the interlaced sweep repetition frequency and of adjustable time occurrence in an interlaced sweep period, connections supplying said gate pulses to said display means for displaying the relative time occurrence of said gate and video pulses, means supplying said gate pulses to the gating device in each channel at least during said respective periods to pass selected signal pulses from said dispersive to said inverse dispersive networks, sweep frequency generating means connected to supply frequency sweeps having substantially said sweep rate to the second mixer in each channel, and means utilizing said gate pulses to control the initiation of sweeps in said sweep frequency generating means in substantially fixed time relationship therewith, whereby a selected displayed input signal may be gated to said output circuit and reproduced in a substantially fixed narrow frequency band.

References Cited in the file of this patent

UNITED STATES PATENTS

| | | |
|---|---|---|
| 2,678,997 | Darlington | May 18, 1954 |
| 2,800,580 | Davies | July 23, 1957 |
| 2,882,395 | White | Apr. 14, 1959 |
| 2,897,442 | Wright et al. | July 28, 1959 |